United States Patent
Hulbert et al.

(10) Patent No.: US 10,783,106 B2
(45) Date of Patent: Sep. 22, 2020

(54) USB AUTORUN DEVICE

(71) Applicant: ARKEYTYP IP LIMITED, County Cork (IE)

(72) Inventors: Thomas Steven Hulbert, London (GB); Durrell Grant Bevington Bishop, London (GB)

(73) Assignee: ARKEYTYP IP LIMITED, Co. Cork (IE)

( * ) Notice: Subject to any disclaimer, the term of this patent is extended or adjusted under 35 U.S.C. 154(b) by 0 days.

(21) Appl. No.: 15/229,200

(22) Filed: Aug. 5, 2016

(65) Prior Publication Data
US 2017/0031861 A1 Feb. 2, 2017

Related U.S. Application Data

(63) Continuation of application No. 12/517,842, filed as application No. PCT/GB2007/004731 on Dec. 10, 2007, now abandoned.

(30) Foreign Application Priority Data

Dec. 8, 2006 (GB) .................................. 0624582.3
Jan. 5, 2007 (GB) .................................. 0700207.4

(51) Int. Cl.
*G06F 13/42* (2006.01)
*G06F 16/23* (2019.01)
(Continued)

(52) U.S. Cl.
CPC ........ *G06F 13/4282* (2013.01); *G06F 3/0219* (2013.01); *G06F 3/04842* (2013.01);
(Continued)

(58) Field of Classification Search
None
See application file for complete search history.

(56) References Cited

U.S. PATENT DOCUMENTS 6,385,729 B1   5/2002  Digiorgio et al.
6,986,030 B2   1/2006  Lang et al.
(Continued)

FOREIGN PATENT DOCUMENTS

WO   2004093149 A2   10/2004
WO   2005066923 A1   7/2005
WO   2006018230 A1   2/2006

OTHER PUBLICATIONS

Inetready Communications, Inc., "The 1,4-54 Internet Webkey Works Quick N' Easy", [Online] pp. 1-3, XP002469290; retrieved from the Internet: URL:http://web.archive/org/web/Z0061018060807/ http://www.internetwebkey.comn/pdf/uswebkey-datasheet.pdf> [retrieved on Feb. 15, 2008], Oct. 18, 2006.

(Continued)

*Primary Examiner* — Henry Tsai
*Assistant Examiner* — Christopher A Bartels
(74) *Attorney, Agent, or Firm* — Saul Ewing Arnstein & Lehr LLP

(57) ABSTRACT

A portable, application-specific USB autorun device, following connection to a computer terminal, automatically initialises or presents itself as a known type of device and then automatically sends to the terminal a sequence of data complying with a standard protocol, that sequence of data automatically causing content to be accessed or a task to be initiated. The device (i) includes a standardised USB module that includes a USB microcontroller, the standardised module being designed to be attached to or embedded in multiple types of different, application specific packages but (ii) excludes mass memory storage for applications or end-user data.

31 Claims, 33 Drawing Sheets

(51) Int. Cl.

| | |
|---|---|
| *G06F 3/02* | (2006.01) |
| *G06F 3/0484* | (2013.01) |
| *G06F 13/40* | (2006.01) |
| *G06F 13/10* | (2006.01) |
| *G06F 13/20* | (2006.01) |
| *G06F 21/34* | (2013.01) |
| *G06F 21/57* | (2013.01) |
| *G06F 21/77* | (2013.01) |
| *G06F 21/85* | (2013.01) |
| *G06Q 10/08* | (2012.01) |
| *G06Q 20/04* | (2012.01) |
| *G06Q 20/06* | (2012.01) |
| *G06Q 20/10* | (2012.01) |
| *G06Q 20/24* | (2012.01) |
| *G06Q 20/34* | (2012.01) |
| *G06Q 20/38* | (2012.01) |
| *G06Q 20/40* | (2012.01) |
| *G06Q 30/00* | (2012.01) |
| *G06Q 30/06* | (2012.01) |
| *H04L 29/06* | (2006.01) |
| *H04W 12/06* | (2009.01) |
| *H05K 5/02* | (2006.01) |
| *H04W 12/08* | (2009.01) |
| *H04N 21/472* | (2011.01) |

(52) U.S. Cl.
CPC ............ *G06F 13/102* (2013.01); *G06F 13/20* (2013.01); *G06F 13/4081* (2013.01); *G06F 16/23* (2019.01); *G06F 21/34* (2013.01); *G06F 21/575* (2013.01); *G06F 21/77* (2013.01); *G06F 21/85* (2013.01); *G06Q 10/0838* (2013.01); *G06Q 20/0453* (2013.01); *G06Q 20/065* (2013.01); *G06Q 20/105* (2013.01); *G06Q 20/24* (2013.01); *G06Q 20/342* (2013.01); *G06Q 20/349* (2013.01); *G06Q 20/385* (2013.01); *G06Q 20/4012* (2013.01); *G06Q 30/016* (2013.01); *G06Q 30/0185* (2013.01); *G06Q 30/0633* (2013.01); *H04L 63/0838* (2013.01); *H04L 63/0853* (2013.01); *H04L 63/0861* (2013.01); *H04L 63/105* (2013.01); *H04W 12/06* (2013.01); *H04W 12/08* (2013.01); *H05K 5/0278* (2013.01); *G06F 2213/0042* (2013.01); *G06F 2221/2153* (2013.01); *H04N 21/47202* (2013.01)

(56) References Cited

U.S. PATENT DOCUMENTS

| | | | |
|---|---|---|---|
| 7,069,442 B2 | 6/2006 | Grawrock et al. | |
| 7,114,018 B1* | 9/2006 | Maity | G06F 3/023 |
| | | | 345/163 |
| 7,275,159 B2* | 9/2007 | Hull | G06F 21/602 |
| | | | 713/171 |
| 7,304,586 B2* | 12/2007 | Wang | G01D 4/002 |
| | | | 340/870.02 |
| 7,454,783 B2 | 11/2008 | Dupouy et al. | |
| 7,511,846 B2 | 3/2009 | Hart et al. | |
| 7,629,963 B1 | 12/2009 | Wright et al. | |
| 8,370,532 B1* | 2/2013 | Gilbert | G06F 3/0605 |
| | | | 710/15 |
| 8,743,891 B2* | 6/2014 | Spooner | H04L 12/66 |
| | | | 370/401 |
| 2002/0057440 A1 | 5/2002 | Weiner et al. | |
| 2002/0068632 A1 | 6/2002 | Dunlap et al. | |
| 2002/0072892 A1* | 6/2002 | Shirley | G06F 3/023 |
| | | | 703/25 |
| 2002/0073340 A1 | 6/2002 | Mambakkam et al. | |
| 2002/0111907 A1 | 8/2002 | Ling et al. | |
| 2002/0147912 A1 | 10/2002 | Shmueli et al. | |
| 2002/0161939 A1* | 10/2002 | Kim | G06F 9/4415 |
| | | | 710/8 |
| 2003/0061515 A1 | 3/2003 | Kindberg et al. | |
| 2003/0135428 A1 | 7/2003 | Smith et al. | |
| 2004/0193653 A1 | 9/2004 | Howard et al. | |
| 2004/0193744 A1 | 9/2004 | Paley et al. | |
| 2004/0259423 A1 | 12/2004 | Elbaz et al. | |
| 2005/0050330 A1 | 3/2005 | Agam et al. | |
| 2005/0131768 A1 | 6/2005 | Rodriguez et al. | |
| 2005/0278544 A1* | 12/2005 | Baxter | G06F 17/30902 |
| | | | 713/182 |
| 2006/0059287 A1* | 3/2006 | Rivard | G06F 9/4411 |
| | | | 710/300 |
| 2006/0075174 A1 | 4/2006 | Vuong et al. | |
| 2006/0077119 A1 | 4/2006 | Zhang et al. | |
| 2006/0143326 A1 | 6/2006 | Hauck et al. | |
| 2006/0173701 A1 | 8/2006 | Gurvey et al. | |
| 2006/0208066 A1* | 9/2006 | Finn | G06K 7/0004 |
| | | | 235/380 |
| 2006/0248205 A1* | 11/2006 | Randle | H04L 63/0869 |
| | | | 709/229 |
| 2006/0291084 A1 | 12/2006 | Weirauch et al. | |
| 2007/0011491 A1 | 1/2007 | Govindarajan et al. | |
| 2007/0078768 A1* | 4/2007 | Dawson | H04N 7/17318 |
| | | | 705/50 |
| 2007/0112981 A1 | 5/2007 | Hernandez et al. | |
| 2007/0145135 A1 | 6/2007 | Jogand-Coulomb et al. | |
| 2007/0160077 A1 | 7/2007 | Altberg et al. | |
| 2007/0252010 A1 | 11/2007 | Gonzalez et al. | |
| 2007/0295982 A1 | 12/2007 | Ryu et al. | |
| 2008/0005446 A1* | 1/2008 | Frantz | G06F 13/107 |
| | | | 710/313 |
| 2008/0112391 A1 | 5/2008 | Hwang et al. | |
| 2008/0189695 A1 | 8/2008 | Andersson et al. | |
| 2008/0270596 A1 | 10/2008 | Wahl et al. | |
| 2009/0157889 A1 | 6/2009 | Treuhaft et al. | |
| 2009/0240947 A1 | 9/2009 | Goyal et al. | |
| 2010/0064063 A1* | 3/2010 | Deforche | G06F 9/4411 |
| | | | 710/5 |
| 2010/0082843 A1* | 4/2010 | Lu | G06F 21/56 |
| | | | 710/10 |
| 2011/0179204 A1* | 7/2011 | Hulbert | G06F 21/34 |
| | | | 710/74 |
| 2017/0243000 A1* | 8/2017 | Shraim | H04L 9/00 |

OTHER PUBLICATIONS

Schneier, "Hacking Computers Over USB", Schneier on Security. A Weblog Covering Security and Security Technology, Nov. 7, 2006.

* cited by examiner

USB AUTORUN DEVICE

CROSS-REFERENCE TO RELATED APPLICATIONS

This application is a continuation of U.S. application Ser. No. 12/517,842, filed Sep. 30, 2010, which claims the priority of PCT/GB2007/004731, filed on Dec. 10, 2007, which claims priority to Great Britain Application No. 0624582.3, filed Dec. 8, 2006 and Great Britain Application No. 0700207.4, filed Jan. 5, 2007, the entire contents of which are hereby incorporated in total by reference

BACKGROUND OF THE INVENTION

1. Field of the Invention

The field of the invention is Universal Serial Bus (USB) Autorun devices.

2. Technical Background

USB is a serial bus standard; devices connecting using the USB standard must have a physical connector that conforms to the standard: there are currently many applicable plug designs (e.g. Series A, Series B, Mini A, Mini B); the USB standard also evolves to cover new plug designs.

The term 'USB autorun device' refers to a USB human interface device (HID) Keyboard autorun device, such as that described in WO2007/077439A2 or a USB compact disc (CD) emulator autorun device.

Universal Serial Bus Human Interface Device Class

Universal Serial Bus (USB) human interface device (HID) is a device class definition of USB devices. This device class consists of human interface devices such as computer keyboards, computer mice, game controllers, and alphanumeric display devices. The USB HID class is defined in a number of documents provided by the USB Implementers Forum (USB-IF) Device Working Group. The primary document used to describe the USB HID class is the Device Class Definition for HID 1.11, available from http://www.usb.org/developers/devclass_docs/HID1_11.pdf.

The USB HID class describes devices used with nearly every modern computer. Many predefined functions exist in the USB HID class. These functions allow hardware manufacturers to design a product to USB HID class specifications and expect it to work with any software that also meets these specifications.

The USB HID class specifications allow for a myriad of other devices under the USB HID class. Some examples are automobile simulation controllers, exercise machines, telephony devices, audio controls, and medical instrumentation. Any device can be a USB HID class device as long as a designer meets the USB HID class logical specifications. This is not to say that there is no need to ship drivers for these devices, nor that an operating system will immediately recognize the device. This only means that the device can declare itself under the human interface device class.

One of the benefits of a well-defined specification like the USB HID class is the abundance of device drivers available in most modern operating systems. The USB HID class devices and their basic functions are defined in USB-IF documentation without any specific software in mind. Because of these generic descriptions, it is easy for operating system designers to include functioning drivers for devices such as keyboards, mice, and other generic human interface devices. The inclusion of these generic drivers allows for faster deployment of devices and easier installation by end-users.

The USB human interface device class can be used to describe both device and interface classes. The interface class is used when a USB device can contain more than one function. It is possible, therefore, to have USB devices with two different interfaces at the same time (e.g. a USB telephone may use a HID keypad and an audio speaker.) The interface devices are also defined with subclass descriptors. The subclass descriptor is used to declare a device bootable. A bootable device meets a minimum adherence to a basic protocol and will be recognized by a computer BIOS. BIOS stands for Basic Input/Output System. BIOS refers to the software code run by a computer when first powered on. The primary function of the BIOS is to prepare the machine so other software programs stored on various media (such as hard drives, floppies, and CDs) can load, execute, and assume control of the computer. This process is known as booting up. BIOS can also be said to be a coded program embedded on a chip that recognises and controls various devices that make up the computer. The term BIOS is specific to personal computer vendors.

Each USB HID interface communicates with the host using either a control pipe or an interrupt pipe. Both IN and OUT control transfers are required for enumeration; only an IN interrupt transfer is required for HID reports. OUT interrupt transfers are optional in HID class devices. An interrupt is an asynchronous signal from hardware indicating the need for attention or a synchronous event in software indicating the need for a change in execution. A hardware interrupt causes the processor to save its state of execution via a context switch, and begin execution of an interrupt handler. Software interrupts are usually implemented as instructions in the instruction set, which cause a context switch to an interrupt handler similarly to a hardware interrupt. Interrupts are a commonly used technique for computer multitasking, especially in real-time computing. Such a system is said to be interrupt-driven.

The host periodically polls the device's interrupt IN endpoint during operation. When the device has data to send it forms a report and sends it as a reply to the poll token. Common devices such as keyboards and mice send reports that are well-defined by the manufacturer. When a vendor makes a custom USB HID class device, the reports formed by the device need only match the report description given during enumeration and the driver installed on the host system. In this way it is possible for the USB HID class to be extremely flexible.

USB HID Keyboard Autorun Device

This device automatically provides input data equivalent to that typed into a computer keyboard when the device is plugged into the USB port of a computer. An example is a webkey which is a USB key that stores a website address. When the webkey is connected to the computer's USB port, it automatically opens a pre-programmed web page by automatically performing a sequence of keystrokes.

USB CD Emulator Autorun Device

This device, when plugged into the USB port of a computer, automatically provides input data equivalent to that taken from a computer CD drive. By storing autorun file data (i.e. by presenting an autorun.inf to the OS), a USB CD emulator autorun device can be used to automatically open a program or run a shell command. An example is a webkey which is a USB key that stores a website address. When the webkey is connected to the computer's USB port, it automatically opens a pre-programmed web page.

Autorun Files

Autorun.inf is an instruction file associated with the Windows Autorun function. An autorun.inf file is a text-based configuration file stored on a CD that tells the operating system which operations to perform on insertion of the CD; which executable to start, which icon to use, and so on.

3. Discussion of Related Art

There are many and varied tasks that can be initiated and content that can be accessed using a personal computer, either locally or remotely via a network. Current options for accessing these tasks or content are typically performed by the user navigating through or interacting with the PC operating system (OS) or a software application using generic input apparatus such as a keyboard and mouse. These navigations and interactions can be complex and lengthy, making them hard to remember; and they are often an abstract set of user actions that have no direct representational relationship to the task or content.

The typical options for accessing tasks or content on a PC using the Graphical User Interface (GUI) of the OS, as described above, present several problems to the user; certain tasks are hard to remember, non-descriptive and non-portable. The user faces increased difficulty when using a PC he is not familiar with, such as a friend's computer or one set up for multiple users, such as a computer in a public place, for example an airport. Further, a non-computer-literate user (for example a child, an old person, or a technophobe) cannot be expected to manage complex interactions to get to a task, such as navigating to a URL, but may be quite happy to interact once they are there—they understand the value in the task, not the complicated process to get to it. An example of the problem stated above is:

A user is unable to access their web-mail easily, particularly a new subscriber, because they have to remember a long sequence of actions, such as the correct website URL, their username and password. A typical set of tasks for this function is too complex to be readily remembered by a user—for example:

Select a text based menu item from a set of drop-down menus within the OS to start a browser application;
Then type in a URL address in the form of a text string;
Navigate to the login page;
Enter a username and password.

A secondary problem that has been identified is that most interactive peripheral hardware such as application-specific input devices usually requires a second step after physically connecting to a computer, such as installing a driver or software. So in cases where application-specific input devices have been created, they are often complicated to set up and are not very portable—being unable to operate with computers that do not have the required drivers or software.

Existing solutions that relate to the problems outlined above are:

Compact Disks (CD) with autorun files (for example, a CD business card) that automatically launches an application or setup wizard on the CD "Hotkeys", such as those found on certain 'Logitech' USB keyboards or other PC peripherals, that can perform a series of tasks or actions from a single key press.

Programmable Keyboard-Macro devices that can be user-programmed with key sequences for example, PI Engineering's X-Keys range of products (refer to U.S. Pat. No. 4,964,075).

USB mass storage devices with specific files or software preinstalled, (such software needing to be manually selected and run by an operator) offering physical and portable access to predefined, or user-defined content. It is also possible to include an 'autorun' file on a USB drive: a user typically plugs a USB drive into a PC and the USB automatically generates data that emulates the operation of a CD. But it is possible to block this kind of CD emulation at the operating system level (and for security reasons, e.g. reducing the risk of viral infection, blocking could become increasingly common).

SUMMARY OF THE INVENTION

The invention includes a portable handheld electronic money token that can be used to purchase goods or services or as electronic cash; in which:

(a) the portable handheld token includes a USB autorun peripheral device;

(b) the USB autorun peripheral device is configured to send to a computing device a sequence of data complying with a standard protocol;

(c) the sequence of data is processable at the computing device to automatically open a connection to a web server that enables the token to be used to purchase goods or services or as electronic cash; and (d) in which the sequence of data, without any prior input of a website address for the web server or login data for that website or prior input of unique data identifying the device at any earlier time by a user, is processable at the computing device to automate direct access, over the internet, to the web server. The device may be a portable, application-specific USB autorun device operable to communicate with a computer terminal such that, following connection to the terminal, the device automatically initialises or presents itself as a known type of device and then automatically sends to the terminal a sequence of data, the data complying with a standard protocol, that sequence of data automatically causing content to be accessed or a task to be initiated.

The device (i) may include a standardised USB module that includes a USB microcontroller, the standardised module being designed to be attached to or embedded in multiple types of different, application specific packages but (ii) excludes mass memory storage for applications or end-user data.

In one implementation, the first predefined sequence of data are keycodes, the keycodes complying with the human interface device (HID) keyboard standard protocol.

Alternatively, the device can automatically initialise or present itself as a CD drive.

The USB autorun module can, in one implementation, be a USB IC module. In another implementation, it can be a USB Integrated Circuit Card module.

Other implementation features are:

The data automatically sent from the device to the terminal causes a URL to be sent by that terminal to open a specific website address. A unique user ID and password (or passcode) can be appended to the URL and passed as parameters to a web server, so that the user can be identified.

The physical shape or marking of the packaging or housing of the device represents or is associated with the single application that the device perform. The packaging or housing is small enough to be held in a hand and readily inserted into a female USB socket on the terminal.

The device is application-specific USB autorun device because it is designed for a single application; we will give a large number of examples of applications in this specification.

An implementation of the invention brings a number of important benefits to the user:
1. The user has a physically descriptive object that represents the single, specific task or process that is initiated or implemented by the HID keycodes.
2. The user no longer needs to remember or learn the complex actions that need to be performed in order to navigate to and run the content or carry out the task/process—he simply connects the device to the PC.
3. The user can initiate or access the task/process from any personal computer terminal running common Operating System software, since the device does not require unique software or drivers because it autoruns.

Because the device has no costly mass memory, it is far cheaper to manufacture than, for example, conventional USB based memory keys, which typically have between 64 MB to 1 GB of Flash memory. Because a single module can be used for a large variety of different applications, that also means that unit costs can be far lower than if the module were custom designed for a specific application.

Furthermore, where HID keyboard emulation is used, there is no risk of the operating system blocking operation, as may happen with conventional USB devices that emulate CDs.

The terminal could be, as noted above, a conventional PC (i.e. personal computer, including Apple Macintosh computer) but also a personal digital assistant (PDA), laptop computer, gaming console, portable gaming device, mobile telephone, smartphone, communicator, wireless information device, web browsing device, portable navigation device and indeed any other kind of electronic information terminal.

DETAILED DESCRIPTION

Figure 1:
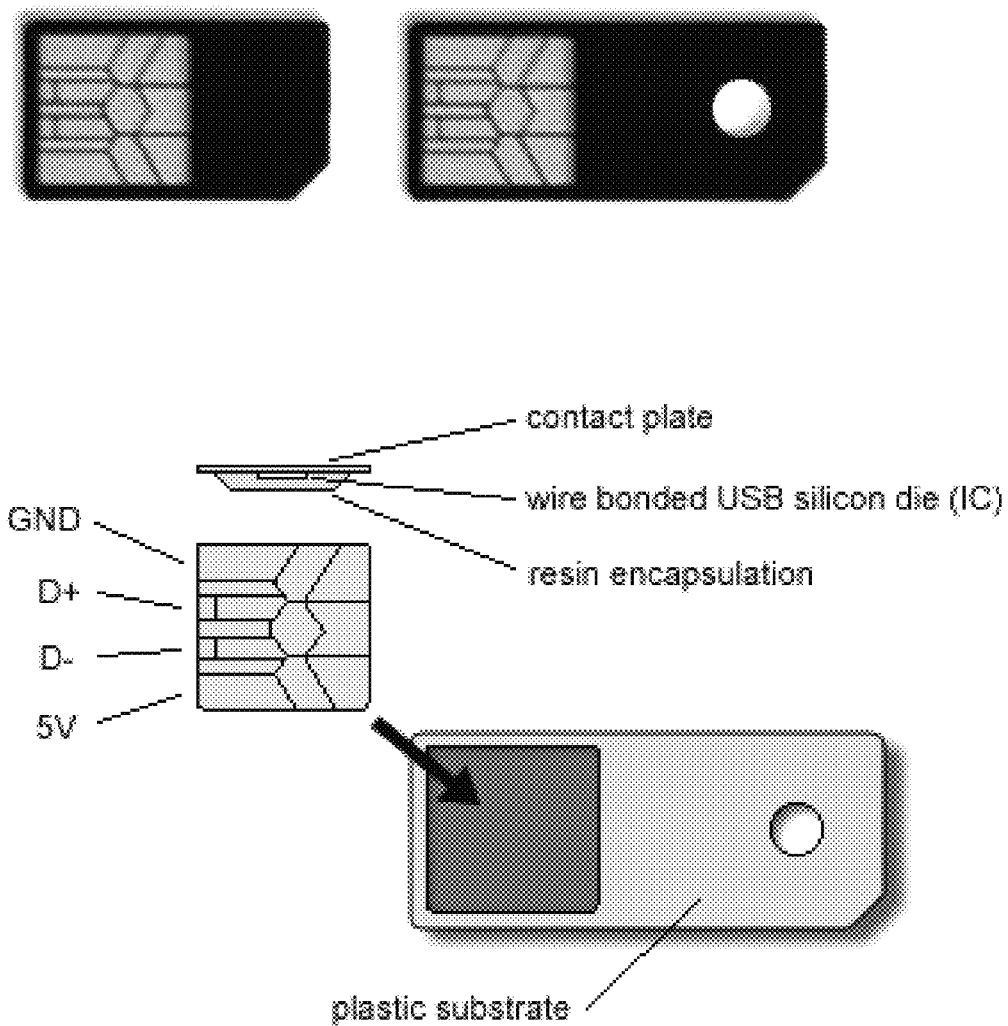
FIG. 1 is examples of USB autorun devices in a card format, and their construction.

An implementation of the present invention is called the 'link-it'. The 'link-it' is a small USB device that automatically runs a task or content on a computer when plugged in. In its simplest form, it links a physical object directly to web content by automatically opening a URL such as a website address. The product removes huge barriers by linking the user directly to web content simply by plugging an object into the computer, using USB as the PC connection with which most users are familiar. As well as solving the key issue of accessibility, the 'link-it' offers many other features including identification, authentication and security, CRM tracking and physical interactivity.

The USB 'link-it' can be manufactured in volume for less than US$1. This makes the product a powerful low cost marketing and loyalty product that can be used in a number of vertical markets as a marketing device that can be given to users to provide easy access to a site and increase user loyalty.

The most widely used product that has turned the USB connection into a common user interface similar to the keyboard or mouse is the USB memory stick. Inevitably the link-it will be compared with this product. The perceived value of a USB memory stick is between $15 and $50. This price is driven almost entirely by the price of memory—the link-it is not a memory product and can therefore be made at a fraction of the cost, initially around $1.

The key technology features of the 'link-it' are:
Autorun
Identification
Authentication and security
Tracking
Input and Output
System Integration Autorun (Direct URL Access)

When a 'link-it' is inserted into a PC it automatically opens, or 'autoruns', a URL which links the user to web content. There are two autorun techniques that can be implemented in the 'link-it' USB device; USB HID keyboard emulation (USBHK) and USB CD drive emulation (USBCD). In the USBHK implementation the device appears to the PC as a standard plug 'n' play keyboard. On connection, the device automatically sends a series of keyboard commands to open the destination URL (e.g. http://www.amazon.co.uk). The website will then be displayed to the user in a web browser. The USBHK implementation has some advantages over the USBCD implementation, particularly as it offers continued input and output between the website and the device and is not blocked by Microsoft Vista. In the USBCD implementation the device appears to the PC as a standard plug 'n' play CD drive containing an autorun file (e.g. 'autorun.inf'). On connection, the autorun file executes and automatically opens the destination URL (e.g. http://www.amazon.co.uk). The website will then be displayed to the user in a web browser. However, USBCD is incompatible with Microsoft Vista.

Identification

Data can be passed to a website through a URL and because each device can be programmed with a unique ID number, like a serial number, each 'link-it' product can be identified by the website's server. If user information for a device is also held by the website then the 'link-it' can be used to identify a user too. A 'link-it' with a unique ID number would thus act a bit like a permanent and portable cookie. Whenever the 'link-it' is connected to a computer it autoruns and opens an internet URL with the ID number appended and passed as a parameter to the web server (e.g. http://www.amazon.com/welcome.cgi?userid=1234)

The server would receive the passed ID number and look up the user in a database. A customised web page would be sent back to the browser. For example, the page might say, "Welcome back, John Smith!" and show the last items the user browsed. Such identification could also be implemented using an intermediary re-direct server that would verify the ID number and redirect to the correct web page for that ID. In this case the company would not need to change its system.

Authentication and Security

An additional level of security would be implemented by including a one-time-only passcode
generator in the device; thus appending a unique passcode to the URL each time the 'link-it' is connected to a computer. This could be used if authentication or user login is required by a web service, such as authorising a music download or logging in to web-mail or an online store. Whenever the 'link-it' is connected to a computer it autoruns and opens an internet URL with an ID number and OTO passcode appended and passed as parameters to the web server. The server would use the ID to look up the sequence of numbers for that ID and identify the next expected passcode. If they match it securely links the user to the appropriate page. This would be invisible to the user. Such a system would prevent the URL from being reproduced and would ensure the web service could only be accessed using the device. An example sequence of generated URLs might be:

1st connection=https://www.amazon.com/login.cgi?userid=1234&passcode=2906

$2^{nd}$ connection=https://www.amazon.com/login.cgi?userid=1234&passcode=5789

$3^{rd}$ connection=https://www.amazon.com/login.cgi?userid=1234&passcode=8631 etc. . . .

This level of security could also be implemented using an intermediary re-direct SSL server that would verify the user ID and OTO passcode and redirect to the correct web page for that user. In this case the company would not need to change its system and the user login URL would not be visible or accessible at any time. For example:

https://link-its.com/rd.php?ucode=1234&pcode=0467 might re-direct to . . .
https://www.amazon.com/login.cgi?user=j.smith&password=midas55

Tracking

The 'link-it' can be tracked from initial use through to repeated interaction with a company's web content. It therefore offers new opportunities for companies to evaluate the success of their online services and enhance their CRM systems. To track the use of the 'link-it', the URL needs to contain something which identifies it as being from the 'link-it'. This can be done in several ways, but most will use some form of identification as described above. Here are a few example scenario.

1. Identification—Logged by Company Using ID Number

A unique ID stored on the link-it is sent as part of the URL. This is received by the company's server and the use of it is logged, the user is sent the appropriate page. The logs can be used to track usage of the link-it and the company could calculate its relationship to successful user transactions. Revenue could be based on successful transactions by checking against a log of the time, date and amount for each transaction.

2. Identification—Logged by Company Using Cookie

To enable easy integration with a company's system, the link-it would store and send an existing identification format e.g. a cookie. Many websites retrieve an ID from a cookie on the user's PC to identify the user. The link-it could send the cookie without being constrained to a specific PC. To track the use of the link-it the cookie must be identifiable as coming from the link-it and not a cookie on the PC. This would not matter if revenue came from introducing new users irrespective of their later method of access. However with minimal changes to the companies system, it may be possible to identify a 'link-it originated' cookie if the server could identify that it hadn't made a request for that cookie.

3. Identification—Logged and Redirected by Intermediary Server

The link-it would autorun a URL, with an ID number appended, which would go to an intermediary server. The server would log the ID and redirect to the appropriate page. This is also a way to log the use of link-its, and for users to access the correct page for their specific ID, without changing the companies user ID format. This would be invisible to the user and very easy to log. No significant changes should be needed to the company's system.

Input and Output (Physical Interactivity)

Various forms of input and output could be integrated into a 'link-it' product, from simple LEDs to low-cost actuators. Depending on the client's needs, designs could be created that enable a greater or lesser degree of interactivity with the product. For example, an Amazon 'link-it' may have a 'buy' button that would move an item into the user's basket; or a Disney toy may have articulated arms and legs that move in time with music from a website. Input and output on the 'link-it' would be achieved with common sensors and actuators, while input and output between the 'link-it' and the website would be achieved using the HID keyboard interface. The device would send keyboard commands to the browser to trigger different website events and the website would send keyboard commands to the device to cause the product to behave in some way.

Communication between the website and the 'link-it' would offer new and exciting interactive possibilities.

System Integration

An important feature of the 'link-it' technology is that it can be easily integrated with a customer's existing back-end system. Whether linking to a simple website address, passing a 'link-it' ID to a server, or integrating with an existing cookie system the 'link-it' should require few changes or additions to the customer's website.

For more advanced market applications such as those that require authentication, and where back-end changes may initially cause complications, an intermediary server could be used to re-direct the 'link-it' to the destination web page. The re-direct server could be hosted by the customer or be offered as an external service.

Re-Direct Server Details

The server application manages a database of client URLs and perform a redirecting function. It will receive URLs (which will include an ID number) from USB devices and redirect to client URLs. Its main function will be to manage the connections between the USB device URLs and the associated client URLs. It will also include ways of adding/amending to the database as well as interfaces for viewing information about the data, such as use statistics. The server application will manage the redirecting process between a USB device URL and the end client URL. It will run on a server and will integrate with a database containing all of the information necessary to perform the redirects. The Server Application also includes data capture so that tracking and statistics can be enabled.

For each end client URL there will be a set of information in the database relating to a client, a job, and the number of products associated with that job. Along with this information, there will be a further set of data relating to the batches of devices, including their batch codes and ID numbers. There may also be other information stored, such as passwords, which might be used for additional services such as web portals for viewing information relating to the use of the device.

Table 1.1 shows the client, job and destination URL information needed in the database. The example given here shows two separate campaigns or jobs for the client Lexus. Each job has a unique reference and a destination URL. Batches of products can then be requested within that job reference.

TABLE 1.1

| End-client reference | Job reference | Job destination url (including optional cgi path) | Job start id (optional) | Job batch number | Job batch size |
|---|---|---|---|---|---|
| LEXUS | LSH08 | http://www.lexus.com/models/LSh/ | | 1 | 5000 |
| | | | | 2 | 10000 |
| | LX07 | http://www.lexus.com/models/LX/trk.cgi?id= | 1001 | 1 | 10000 |
| | | | | 2 | 15000 |

The job destination URL may include an optional CGI path. This could be used by a client to receive device ID numbers. If a CGI path is specified then a job start ID will need to be supplied. The start ID will be the ID passed to the client URL by the first device in that job. All subsequent devices will pass an ID number incrementing from this start ID.

The information shown above in Table 1.1 is related to the client and job. Table 1.2 shows further data associated to the client jobs but this time the data relates to the actual batches of Visible Computing devices, and includes the batch codes and device ID numbers.

TABLE 1.2

| JOB BATCH NUMBER | JOB BATCH SIZE | JOB PASS-WORD | BATCH NUMBER | BATCH CODE | BATCH START ID | BATCH QUAN-TITY |
|---|---|---|---|---|---|---|
| 1 | 5000 | default | 1 | AX12 | 1 | 5000 |
| 2 | 10000 | | 2 | U894 | 1 | 5000 |
| | | | 3 | 19KJ | 1 | 5000 |
| 1 | 10000 | default | 1 | GH3E | 1 | 5000 |
| | | | 2 | S3DF | 1 | 5000 |
| 2 | 15000 | | 3 | S3DF | 1 | 5000 |
| | | | 4 | T74X | 1 | 5000 |
| | | | 5 | 3D5T | 1 | 5000 |

Table 1.3 shows the final URLs stored in the devices.

TABLE 1.3

(continued from Table 1.2)

| BATCH CODE | BATCH START ID | BATCH QUANTITY | BATCH START URL (STORED IN USB DEVICE) | BATCH END URL (STORED IN USB DEVICE) |
| --- | --- | --- | --- | --- |
| AX12 | 1 | 5000 | http://vcgw.net/AX12/trk.cgi?id=000001 | http://vcgw.net/AX12/trk.cgi?id=001388 |
| U894 | 1 | 5000 | http://vcgw.net/U894/trk.cgi?id=000001 | http://vcgw.net/U894/trk.cgi?id=001388 |
| 19KJ | 1 | 5000 | http://vcgw.net/19KJ/trk.cgi?id=000001 | http://vcgw.net/19KJ/trk.cgi?id=001388 |
| GH3E | 1 | 5000 | http://vcgw.net/GH3E/trk.cgi?id=000001 | http://vcgw.net/GH3E/trk.cgi?id=001388 |
| S3DF | 1 | 5000 | http://vcgw.net/S3DF/trk.cgi?id=000001 | http://vcgw.net/S3DF/trk.cgi?id=001388 |
| S3DF | 1 | 5000 | http://vcgw.net/S3DF/trk.cgi?id=000001 | http://vcgw.net/S3DF/trk.cgi?id=001388 |
| T74X | 1 | 5000 | http://vcgw.net/T74X/trk.cgi?id=000001 | http://vcgw.net/T74X/trk.cgi?id=001388 |
| 3D5T | 1 | 5000 | http://vcgw.net/3D5T/trk.cgi?id=000001 | http://vcgw.net/3D5T/trk.cgi?id=001388 |

So in practice:

1. A user inserts a device which auto-launches a URL such as http://vcgw.net/GH3E/trk.cgi?id=000001

2. The Visible Computing server application would receive the batch code and ID number and use them to search the database 3. The server application would find the Job Reference and the associated Destination URL in the database. It would also find whether or not to pass an ID number to the Destination URL.

4. The server application would then redirect to the Destination URL and the web page would load in the user's browser.

Product Variants

The manufacture will be undertaken in three phases that cover three planned variants. These phases are:

Phase 1

The aim of phase 1 is to bring a product to market in the shortest possible time and at the lowest cost. To achieve this we use a product that offers basic URL linking and identification. The USB module within this product is re-packaged for different applications and markets (e.g. assembled into new plastic mouldings).

Phase 2

The aim of phase 2 is to develop the technology toward a design that can better support a wide range of applications, has an improved mechanical design and has a cost reduction over phase 1. Key to achieving this phase is a low-cost, single USB IC solution. A USB module, not much larger than a USB connector, is based around this IC. This new design offers extended functionality, beyond URL linking and identification, such as OTO passcode security and device I/O.

The USB module would be attached-to or embedded-in different packages for different applications and markets (e.g. attached to print, inserted into a plastic moulding or overmoulded as a USB plug on a cabled product).

Phase 3

The aim of phase 3 is to evolve the technology toward a smart card format (ICC) which will further broaden the range of possible applications and markets while at the same time creating further cost reductions and enabling high volume production. A low-cost USB card module is inserted into the standard card manufacturing process. The card format would offer an opportunity to create low-cost end products using just printing and die-cutting techniques, while also producing a component design that could be attached-to or embedded-in different packages for different applications and markets.

Detailed Operation of the Device

The apparatus initiates/accesses a task or content by automatically performing a pre-programmed action whenever the user connects the apparatus to the PC. Alternatively, the apparatus can perform the action by limited interaction with the user—requiring a two-step sequence. In this alternative embodiment, the user connects the apparatus to a PC, thus initiating a pre-programmed sequence of actions; and later presses a button on the apparatus to initiate a separate pre-programmed or alternatively user-programmed sequence.

In either event, the apparatus emulates a HID keyboard device and sends keycodes complying with the HID protocol to the PC. The Universal Serial Bus (USB) human interface device (HID) is a device class definition of USB devices. This device class consists of human interface devices such as computer keyboards, computer mice, game controllers, and alphanumeric display devices. The USB HID protocol is defined in a number of documents provided by the USB Implementers Forum (USB-IF) Device Working Group. The primary document used to describe the USB HID class is the Device Class Definition for HID 1.11, available from:

http://www.usb.org/developers/devclass_docs/HID1_11.pdf.

The task or content is either accessed locally on the PC (for example, open a new email window using the PC's default email application) or accessed remotely over a network (for example, stream an audio file over the internet from a remote server, via a unique reference or URL).

In the preferred embodiment, the pre-programmed sequence of actions initiating a task or accessing content is made up of a series of simulated user-keyboard events or keystrokes. These are sent as HID protocol compliant keycodes in a sequence from the apparatus to the PC. The action either inputs directly to the PC's operating system (for example, to open a URL using internet explorer) and/or controls a separate software application (for example, opening and initiating playback of a network audio file from within windows media player) or performs data-entry functions (for example, entering a text string into a field on a form).

In a preferred embodiment, when the apparatus is connected to a PC it 'initialises', (e.g. emulates, simulates, presents itself or enumerates) as a standard 'plug and play' HID keyboard. After starting up correctly and establishing a connection, the apparatus sends a timed sequence of keycodes, simulating a specific sequence of (normally user-generated) keystrokes used to access the given task or content by a method determined by the operating system or application. The sequence of keycodes is acted upon by the PC operating system (or application) and the task is thus initiated or content accessed.

In a preferred embodiment, the method determined by the operating system would be a Command Line Interface built into the Operating System (OS) and into which commands can be entered in the form of text (that is, a sequence of typed characters) or a similar standard feature of the OS that enables direct access to programs, files, network paths and internet URLs via text based commands. On the Windows operating system, the Windows Run box is an example of this type of interface and is accessed by a sequence of keystrokes comprising Winkey+R. Therefore, in a preferred embodiment, the initial sequence of keycodes sent by the apparatus would be those for 'Winkey' and 'R' key; this initial sequence being followed by a subsequent sequence of keycodes that would be entered into the Run box and which would initiate the task or access the content.

The method determined by the application would differ and would be dependent on the application but would also comprise a sequence of keycodes. The sequence of keycodes would be recognised by the application, which would perform the associated task or process.

In some embodiments the apparatus initialises to simulate more than one USB interface, for example, both as a human input device profile (HID) keyboard and a HID mouse. In these cases the keyboard interface is used to access the task or content; after which a combination of the keyboard interface profile and additional interface profiles will be used to control or interact with the task or content. For example, an 'etch-a-sketch' style drawing game/toy transmits keycodes, causing the operating system (OS) to open a drawing application such as Microsoft Paint; subsequently mouse events are transmitted from the apparatus, causing drawing actions within the application.

Thus the apparatus takes advantage of inbuilt components of commonly used operating systems, such components effectively comprising pre-installed driver applications with limited functionality. Because certain profiles such as the HID profiles mentioned above conform to agreed standards for communication, the apparatus, by communicating with a PC only according to the agreed standard, functions properly on a wide range of available PCs, even when the PCs have different operating system software such as MacOS or Windows.

Some examples of additional USB interfaces that use such standard system drivers are: pointer, mouse, joystick, gamepad, keyboard (HID); Audio; Mass Storage.

As an enhancement in some embodiments a basic form of bi-directional communication may be achieved as follows: When the apparatus initialises as a HID keyboard, the user strikes a 'modifier' or locking key such as NUMLOCK and/or CAPSLOCK and/or SCROLLLOCK and/or KANALOCK on their PC keyboard. When these keys are pressed, data is sent from the PC to the keyboard indicating the state of these keys; this data is typically used to turn on/off LEDs on the keyboard. This data is normally sent to all keyboards connected to the PC; therefore if a user hits one such key on their PC keyboard, data is typically sent to the apparatus also. The data thus received from the PC causes the apparatus to perform an action. For example, the user presses NUMLOCK on their PC keyboard and a superhero toy connected to the PC initiates an animated sequence (the body parts of the toy start to move).

Software can also generate Locking Key events (i.e. software can simulate the pressing of a Locking Key). Therefore software can communicate to the apparatus using this method, without any user interaction needed. For example, a java applet in a web page could communicate with a superhero toy connected to the PC, initiating an animated sequence (the body parts of the toy start to move).

The apparatus connects to the PC using the Universal Serial Bus (USB) connection and protocol. USB is currently the most appropriate connection and communication system for the apparatus since it is commonly available, normally physically accessible and because it requires no user set-up when simulating a 'plug and play' HID device. The USB port is a familiar, common and easy-to-use connection point to which HID devices can be connected without the need of driver installation. Alternatively, the apparatus can connect using a wireless protocol such as Bluetooth or Zigbee but these methods currently impose certain limitations on the portability of the system because of the security inherent in these systems.

In a wireless embodiment, the apparatus includes both a USB connection and a wireless connection; the apparatus is first connected physically to the PC by the USB connection, initiating transmission of a sequence of keycodes that performs a 'pairing' operation between the apparatus and the PC; thus providing clearance for subsequent automatic wireless communication between the apparatus and the particular PC. Upon such subsequent wireless communication, the apparatus performs in a similar way to the embodiments described having physical connections. For example, by transmitting via the commonly available Bluetooth HID profile (instead of the USB HID profile) in order to simulate keystrokes by transmitting keycodes.

Because of the low-cost modular system used in the present invention, it may very readily and rapidly be applied to many alternative configurations, and used in many varied applications. Some examples include:

Device 1 (USB Autorun Device in a Card Format)

This device type is show in FIG. 1. A low-cost, mass produced, componentized form-factor for the USB autorun device would mean that the system could be broadly applied, from embedding into objects and attaching to print through to supplying finished printed and die-cut cards as an end product.

A card format device could be produced using the technologies and manufacturing techniques used for the production of IC cards (ICC), commonly referred to as smart-cards or chip-cards. ICCs typically consist of a plastic card substrate with an embedded integrated circuit module; the embedded module being a complete IC and contact plate. Examples of ICCs in use are SIM cards and credit cards.

A module suitable for use in a USB autorun device could be produced using a USB microprocessor IC USB contacts, such as is shown in FIG. 1.

Device 2 (USB Autorun Device with Keypad for Secure Use)

Figure 2:
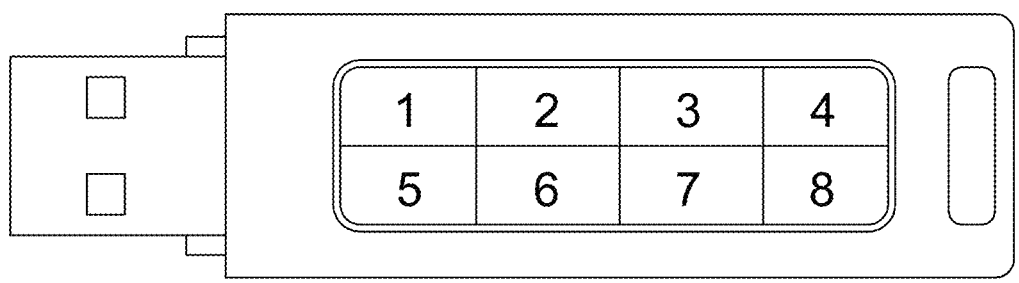
FIG. 2 is an example of a USB autorun device with keypad for secure use.

For some applications, the USB autorun device is used to access a private or secure website or may pass user login information to a server. In such cases, an additional level of security could be added by integrating a keypad into the device, as shown for example in FIG. 2.

The keypad would be used to manually enter a PIN (personal identification number). If the correct PIN is entered the device would autorun, opening the URL on the computer. Thus, the website or login could only be accessed with the device in combination with the correct PIN.

Device 3 (USB Autorun Device with Fingerprint Recognition for Secure Use)

Figure 3:
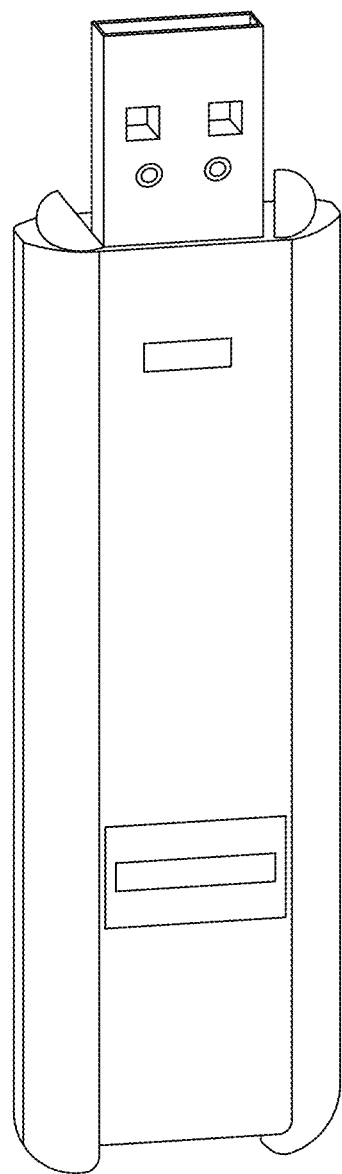
FIG. 3 is an example of a USB autorun device with fingerprint recognition for secure use.
Figure 3:
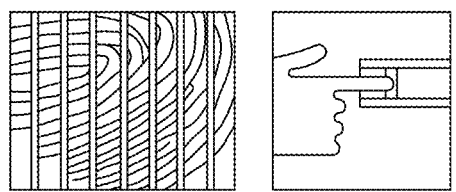

For some applications, the USB autorun device is used to access a private or secure website or may pass user login information to a server. In such cases, an additional level of security could be added by integrating a fingerprint scanner into the device, as shown for example in FIG. 3.

The scanner would be used to read the user's fingerprint. If the correct fingerprint (e.g. matching data stored on the terminal (or even the device itself) is recognised the device would autorun, opening the URL on the computer. Thus, the website or login could only be accessed with the device in combination with the user's unique fingerprint.

Device 4 (USB Autorun Device Used to Access a User Customised or Personalised Website: Portable Cookie)

Figure 4:
FIG. 4 is an example of a USB autorun device used to access a user customised or personalised website i.e. a portable cookie.

This device type is show in FIG. 4. An internet cookie is a text file on a computer that contains one or more pieces of information. A web server sends a cookie to the user's computer and the browser stores it. The browser then returns the cookie to the server the next time the page is loaded. The most common use of a cookie is to store a user ID. For example, the cookie might contain the following string: ID=12340987

Amazon.com is an example of a site that uses internet cookies. When you order from the Amazon site, you fill out a form with your name and address. Amazon assigns you an ID, stores your information with that ID in its database on its server, and sends the ID to your browser as a cookie. Your browser stores the cookie on your computer's hard disk. The next time you go to Amazon, the ID is sent back to the server. The server looks you up by your ID and customises the web page it sends back to you. The page might say, "Welcome back, John Smith!"

However, internet cookies are stored on your computer's hard disk and so are only useful when you are using that specific computer. They can also be deleted.

A USB autorun device with a unique ID number would act as a permanent and portable cookie; an example is shown in FIG. 4. Whenever the USB autorun device is connected to a computer it autoruns and opens an internet URL. The ID number could be appended to the URL and passed as a parameter to the web server. An example of the full URL might be:

http://www.amazon.com/welcome.cgi?userid=12340987

The server would receive the passed ID number and look up the user in a database. A customised web page would be sent back to the browser. As before, the page might say, "Welcome back, John Smith!"

An ID number could be associated with an entry in the server database, containing the user's information, in two ways.
1. The user's information could be received and entered into the database before the user obtains the USB autorun device (e.g. they are given or sent the device when making a purchase in a store or online).
2. The user could obtain a USB autorun device with a unique device ID that is associated with an empty database entry. Thus, when the user uses the device for the first time the web page that loads would not be customised. The user would then fill out a form with their name and address. The server database would then be updated; the device ID would now be associated with the user's information. The next time the device is used, a customised web page would load.

Device 5 (USB Autorun Device Used as Smart Stationery/Paperclip: Link-its)

Figure 5:
FIG. 5 is an example of a USB autorun device used as smart stationary/paperclip: Link-Its.

The USB autorun device could be applied as a form of smart stationery, whereby a physical object, such as a printed document, could have a device temporarily attached to it that would autorun and open a URL when connected to a computer; an example is shown in FIG. 5. The URL could link to such things as a Word file on an FTP server, a web page, a presentation and so on. Examples of URLs that could be opened by the device are:

file://192.168.0.4/data/project_folder/agenda.doc
ftp://78.62.111.20/marketing/analysis_table.xls
http://www.visiblecomputing.com/aboutus.html For example, when people share printed copies of a document they often want to give the recipient a reference to the digital version of the document. This reference is often the location of a folder on a (local or network) computer or the URL for an FTP server location. The reference is often given in writing or verbally. A USB autorun device, in the form of a smart paperclip for example, would allow the person to give a reference to the digital document in a more tangible and intuitive way. When the recipient of the document connects the smart paperclip to the USB port of his computer, the device would autorun and open the URL for the digital version of the document (e.g. file://192.168.0.4/data/project_folder/agenda.doc). The document would then open on the recipient's computer. Thus, in use, a person receives a printed document with a smart paperclip device attached, connects the device to the USB port of his computer and the digital version of the document automatically opens on his computer.

A user could 'save' a URL to a smart paperclip device in two ways:
1. Software on the users computer could be used to electronically write a user defined URL to the device, for example by sending it via a generic HID interface (the device would be a composite device with one USB interface used for the autorun process and a second USB interface used to receive new URL data).
2. A web application could be used to associate a unique ID for the paperclip device with a user defined URL (the association would be stored on a server database). The device would autorun the URL of the web application with the device ID appended (e.g. http://www.link-its/services/weblinker.php?id=12340987). On first connection, the user would enter a URL using the web application. On subsequent connections of the device, the web application would redirect to the target URL.

Device 6 (USB Autorun Device Used as a Smart Product/Clothes Tag)

Figure 6:
FIG. 6 is an example of a USB autorun device used as a smart product/clothes tag.

The USB autorun device could be applied as a smart tag attached to a product or item of clothing by a manufacturer (or reseller); an example is shown in FIG. 6. A product or item of clothing could have a device temporarily attached to it that would autorun and open a URL when connected to a computer. The URL could link to the manufacturer's website, or an area of the site that specifically relates to the product/clothing or to a web service that the manufacturer wants to promote (e.g. electronic user-manuals, servicing/repair portals, related driver/software downloads, web games and experiences or online communities etc.)

For example, when a person purchases a branded product, such as Nike trainers, the manufacturer may want to encourage the customer to go to their website; the aim being to increase the customer's awareness of their products or perhaps to involve them in some kind of branded online experience, such as an online training tool. This is typically done using a written URL printed either on the products packaging or on a flyer. A USB autorun device, in the form of a smart product tag, would allow the manufacturer to give access to the online experience in a more tangible and intuitive way. When the customer connects the product tag to the USB port of his computer, the device would autorun and open the URL for the manufacturer's website or online experience, for example:

http://www.nike.com/europerunning/?ref=train_tool).

Thus, in use, a person buys a product, such as Nike trainers, with a smart tag attached; he detaches the tag and connects it to the USB port of his computer; whereupon a webpage automatically opens on his computer, enabling him to interact with a branded online experience.

Device 7 (USB Autorun Device Used as a Smart Purchase Receipt/Ticket)

Figure 7:
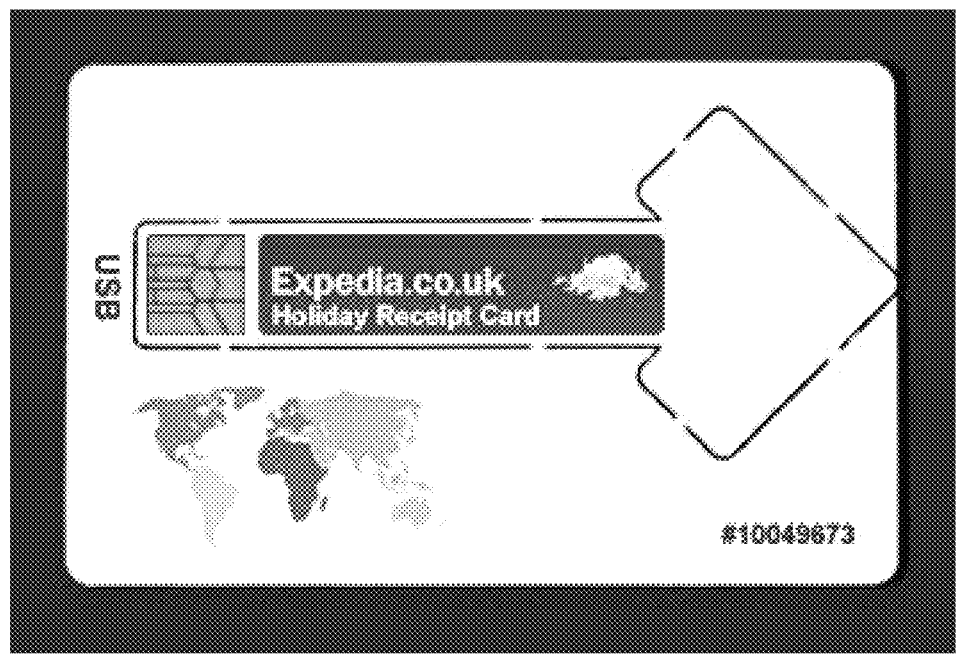
FIG. 7 is an example of a USB autorun device used as a smart purchase receipt/ticket.

The USB autorun device could be applied as a smart receipt or ticket when buying a product, such as a car, or making some other kind of purchase, such as booking a holiday or flight. An example is shown in FIG. 7. At the point of sale the customer would be given or sent a device that would autorun and open a URL when connected to a computer. An ID number would be appended to the URL and passed as a parameter to a web server so that the receipt could be identified. The URL would link directly to the seller's website (or an area of the site) that would give specific information relating to the user's purchase, such as order tracking information or after sales care, information and offers. An example of the full URL might be:

https://www.expedia.co.uk/holidays/track/agent.cgi?receiptid=12340987

For example, when a person purchases a holiday, they often want to check various types of information relating to their holiday in the period leading up to the departure date. They may want to view the hotel details, check flight numbers and departure times or find out about the local area. This is typically done using the travel agents website or customer service phone line, but can be a complicated process when trying to find all of the information relating to their specific holiday. The travel agent may also want to encourage the user to visit their website; the aim being to increase the customer's awareness of offers that relate to their holiday, such as car hire, or other holidays that may interest them in the future.

A USB autorun device, in the form of a smart purchase receipt, would allow the travel agent to give access to after sale information and offers in a more tangible and intuitive way. The customer would obtain the smart purchase receipt when purchasing the holiday. When the customer connects the smart purchase receipt to the USB port of his computer, the device would autorun and open a URL with an ID number appended. The URL would link directly to the travel agent's website and simultaneously pass an ID number to the server so that the receipt could be identified. The server would receive the passed ID number and look up the user in a database. A customised web page would be sent back to the user's browser containing various information specifically relating to his holiday, such as dates, departure times, hotel details, current weather information, car hire offers and so on.

Thus, in use, a person purchases a holiday and subsequently receives a smart purchase receipt; he connects it to the USB port of his computer; whereupon a customised webpage automatically opens on his computer, enabling him to view information relating to his specific holiday booking.

Device 8 (USB Autorun Device Used as a Gift Voucher/Token)

Figure 8:
FIG. 8 is an example of a USB autorun device used as a gift voucher/token.

The USB autorun device could be applied as a gift voucher or token. An example is shown in FIG. 8. A voucher could be purchased that would autorun and open a URL when connected to a computer. The URL could link to an online store where the voucher could be redeemed; items being purchased up to the value of the voucher. An ID number could be appended to the URL and passed as a parameter to a web server so that the voucher could be identified, verified and its use tracked. An example of the full URL might be:

http://phobos.apple.com/WebObjects/MZStore.woa/wa/storeFront?id=12340987

The voucher could have various designs and offer numerous possibilities to create a gift that was graphically rich, if in the form of a card for instance, or physically desirable.

For example, a person may wish to give a gift of digital media, such as music downloads, that are redeemable online. This is typically done using a unique code that is written in an email or on a printed voucher; the voucher code is given to the recipient and needs to be entered when purchasing from an online store. A USB autorun device, in the form of a gift voucher or token, would allow the person to give a gift of digital media in a more tangible way. When the recipient of the gift voucher connects the device to the USB port of his computer, the device would autorun and open a URL with a voucher ID number appended. The URL would link directly to the online store and simultaneously pass an ID number to the online store server so that the voucher could be identified and verified. The online store would thus confirm that the voucher was genuine and determine the available credit that could be redeemed using the voucher.

An additional level of verification could be implemented if the device included a one-time-only passcode generator; thus appending a unique verification code (passcode) to the URL each time it is connected to a computer. The online store server would know the expected verification codes for that voucher ID. This would prevent the URL from being reproduced and would ensure the voucher value could only be redeemed using the device. An example sequence of generated URLs might be:

http://phobos.apple.com/WebObjects/MZStore.woa/wa/storeFront?id=12340987&vcode=3245 http://phobos.apple.com/WebObjects/MZStore.woa/wa/storeFront?id=12340987&vcode=8375 http://phobos.apple.com/WebObjects/MZStore.woa/wa/storeFront?id=12340987&vcode=9026

Thus, in use, a person receives a smart gift voucher; he connects it to the USB port of his computer; whereupon the webpage for an online store automatically opens on his computer, enabling him to purchase items up to the value of the voucher; the voucher having been automatically identified and verified.

Device 9 (USB Autorun Device Used to Access a User's Web-Mail)

Figure 9:
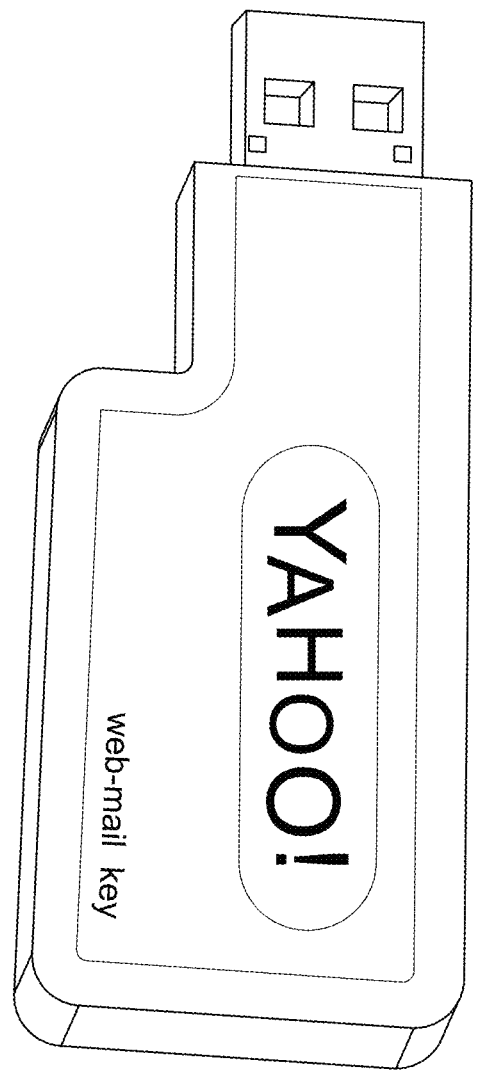
FIG. 9 is an example of a USB autorun device used to access a user's web-mail.

The USB autorun device could be applied as a portable web-mail key, used to access a user's web-mail on any internet connected computer. An example is shown in FIG. 9. The web-mail key could be purchased from or given away free by a web-mail service provider. When connected to a computer the device would autorun and open the URL of the web-mail service. A unique user ID and password (or passcode) would be appended to the URL and passed as parameters to the web-mail server, so that the user could be identified and thus login to his personal web-mail. An example of the full URL might be:

http://mail.yahoo.com/login?user=johnsmith&pass=046756

For example, a person may wish to access their web-mail at home, at work or while travelling. This is typically done using a web based email service accessed via an internet browser; the user is required to navigate to the login page of the web-mail service and enter their login information, such as a username and password. A USB autorun device, in the form of a web-mail key, would allow the person to access their web-mail in a more direct, portable, tangible and intuitive way. When the user connects the device to the USB port of any internet connected computer, the device would autorun and open a URL with the user's username (or usercode) and password (or passcode) appended. The URL would link directly to the web-mail service and simultaneously pass the user's information to the web-mail server so that the user could be identified and their login authenticated. The web-mail server would thus accept the login request and the user would gain access to their web-mail page or inbox page.

An additional level of security could be implemented if the device included a one-time-only passcode generator; thus appending a unique passcode to the URL each time it is connected to a computer. The web-mail server would know the expected sequence of passcodes for that user. This would prevent the URL from being reproduced and would ensure the user's web-mail could only be accessed using the device. An example sequence of generated URLs might be:

1: http://mail.yahoo.com/login?usercode= 1234&passcode=0467

2: http://mail.yahoo.com/login?usercode= 1234&passcode=5789

3: http://mail.yahoo.com/login?usercode= 1234&passcode=8631

This level of security could also be implemented using a third party re-direct SSL server that would verify a user ID and OTO passcode and redirect to the web-mail inbox for that user. Thus, the web-mail service would not need to change its system and the user login URL would not be visible or accessible at any time. For example:

http://wmail.com/rd?ucode=1234&pcode=0467 http://mail.yahoo.com/login?user=j.smith&pass=midas

Thus, in use, a person carries a portable web-mail key device; he connects it to the USB port of any internet connected computer; whereupon the inbox page of his web-mail service automatically opens on the computer, enabling him to read, manage and send his emails; the device having passed login information to the web-mail server.

Device 10 (USB Autorun Device Used to Access a User's Online Photo Collection (e.g. Flickr))

Figure 10:
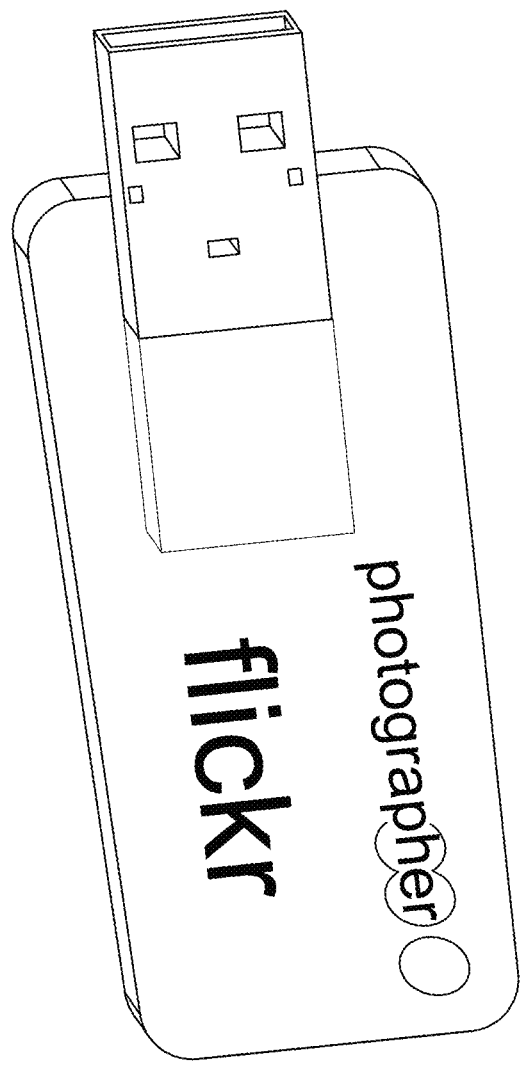
FIG. 10 is an example of a USB autorun device used to access a user's online photo collection (e.g. flickr).

The USB autorun device could be applied as a portable key to access an online photo management and sharing service, such as flickr.com. An example is shown in FIG. 10. The device could be purchased from or given away free by the service provider. When connected to a computer the device would autorun and open the URL of the photo management and sharing service. A unique user ID and password (or passcode) would be appended to the URL and passed as parameters to the server, so that the user could be identified and thus login to their personal area of the website to manage their photo collection. An example of the full URL might be:

http://www.flickr.com/signin/flickr/
      login?user=johnsmith&pass=046756

For example, a person may wish to access and manage their personal online photo collection at home, at work or while travelling. This is typically done using a web based application accessed via an internet browser; the user is required to navigate to the login page of the online photo management service and enter their login information, such as a username and password. A USB autorun device would allow the person to access their online photo collection in a more direct, tangible and intuitive way. When the user connects the device to the USB port of any internet connected computer, the device would autorun and open a URL with the user's username (or usercode) and password (or passcode) appended. The URL would link directly to the online photo management service and simultaneously pass the user's information to the server so that the user could be identified and their login authenticated. The server would thus accept the login request and the user would gain access to their personal photo collection; being able to manage and upload their photos.

Thus, in use, a person carries a portable device; he connects it to the USB port of any internet connected computer; whereupon his personal online photo collection automatically opens on the computer, enabling him to manage, upload and print his photos; the device having passed login information to the server.

Further to this, a set of similar devices could be given to people with whom the user wishes to share his photos. When the recipients connect their device to a computer the device would autorun and open a URL linked to the user's public photo collection. An example of the full URL might be:

http://www.flickr.com/photos/59326549@N00/

In the second case the devices may be physically customised in someway so as to be appropriate as a gift (e.g. they may have one of the user's photos applied in print form).

Device 11 (USB Autorun Device Used to Access a User's Area on a Blog or Community Site (e.g. Blogger, Myspace))

Figure 11:
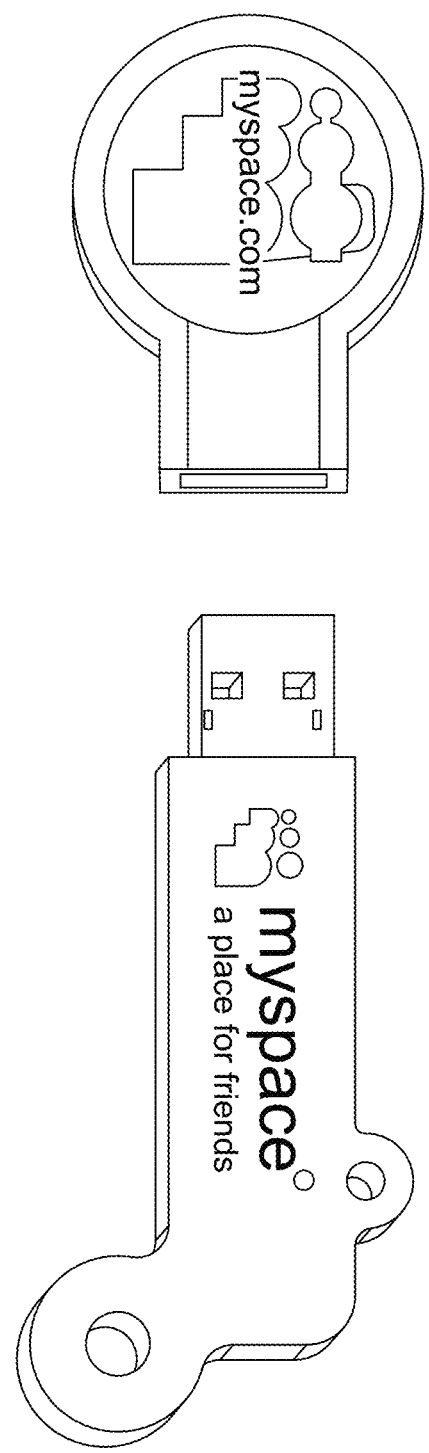
FIG. 11 is an example of a USB autorun device used to access a user's area on a blog or community site (e.g. blogger, myspace).

The USB autorun device could be applied as a portable key to access a blog or community site, such as blogger or myspace. An example is shown in FIG. 11. The device could be purchased from or given away free by the service provider. When connected to a computer the device would autorun and open the URL of the site. A unique user ID and password (or passcode) would be appended to the URL and passed as parameters to the server, so that the user could be identified and thus login to their personal area of the website to update their blog or community site. An example of the full URL might be:

http://www.myspace.com/signin/
      login?user=johnsmith&pass=046756

For example, a person may wish to access and manage their personal blog or space on a community site at home, at work or while travelling. This is typically done using a web based application accessed via an internet browser; the user is required to navigate to the login page of the blog or community site and enter their login information, such as a username and password. A USB autorun device would allow the person to access their blog or community site in a more direct, tangible and intuitive way. When the user connects the device to the USB port of any internet connected computer, the device would autorun and open a URL with the user's username (or usercode) and password (or passcode) appended. The URL would link directly to the blog or community site and simultaneously pass the user's information to the server so that the user could be identified and their login authenticated. The server would thus accept the login request and the user would gain access to their blog or community site; being able to manage and update the site.

Thus, in use, a person carries a portable device; he connects it to the USB port of any internet connected computer; whereupon his personal blog or community site automatically opens on the computer, enabling him to manage and update the site; the device having passed login information to the server.

Further to this, a set of similar devices could be given to people with whom the user wishes to share his blog or community site. When the recipients connect their device to a computer the device would autorun and open a URL linked to the user's public area of the blog or community site. An example of the full URL might be:

http://profile.myspace.com/
  index.cfm?fuseaction=user.viewProfile&friendID=
  87223620

In the second case the devices may be physically customised in someway so as to be appropriate as a gift.

Device 12 (USB Autorun Device Used to Access a Multi-User Collaboration Tool)

Figure 12:
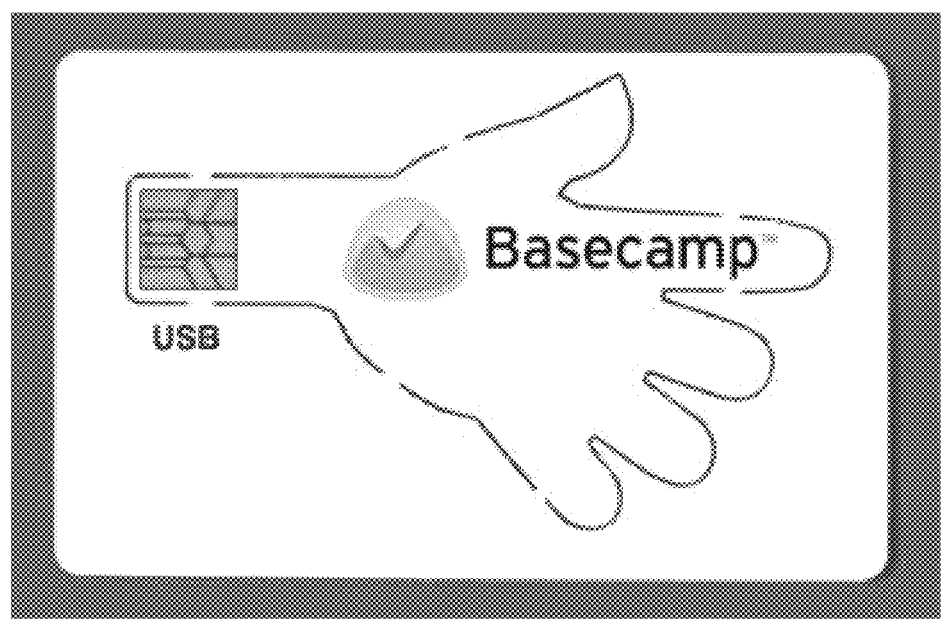
FIG. 12 is an example of a USB autorun device used to access a multi-user collaboration tool.

This device type is show in FIG. 12. Collaboration tools can include instant messaging and discussion forums, to-do lists, audio and video conferencing, group calendars and address books, ways of sharing files, room booking, applications that more than one person can work in at once (collaborative whiteboards) and presentation systems. These tools can be shared amongst a user group so that they can collaborate on projects privately across the internet. These tools can either be software solutions or web-based solutions.

The USB autorun device could be applied as a portable key to access a collaboration tool, such as Basecamp (see http://www.basecamphq.com). An example is shown in FIG. 12. When connected to a computer the device would autorun and open the URL of the web-based collaboration tool. A unique user ID and password (or passcode) would be appended to the URL and passed as parameters to the server, so that the user could be identified and thus automatically login as a member of the user group. They would then have access to a set of shared tools, such as calendars, messaging, whiteboards etc. for a particular group project. An example of the full URL might be:

http://hitechltd.grouphub.com/
  login?user=johnsmith&pass=046756

An additional level of verification could be implemented if the device included a one-time-only passcode generator; thus appending a unique passcode to the URL each time it is connected to a computer. The server would know the expected passcodes codes for that device. This would prevent the URL from being reproduced and would ensure that the group collaboration tool could only be accessed using the device. An example sequence of generated URLs might be:

1=http://hitechltd.grouphub.com/login?user=
  johnsmith&pass=3245
 2=http://hitechltd.grouphub.com/
  login?user=johnsmith&pass=8375
 3=http://hitechltd.grouphub.com/
  login?user=johnsmith&pass=9026

For example, a person may wish to access a collaboration tool for a group project, while at work, at home, or while travelling. This is typically done using a web based application accessed via an internet browser; the user is required to navigate to the login page of the online collaboration tool for their user group and enter their login information, such as a username and password. A USB autorun device would allow the person to access the online collaboration tool in a more direct, tangible and intuitive way. When the user connects the device to the USB port of any internet connected computer, the device would autorun and open a URL with the user's username (or usercode) and password (or passcode) appended. The URL would link directly to the online collaboration tool for the specific user group and simultaneously pass the user's information to the server so that the user could be identified and their login authenticated. The server would thus accept the login request and the user would gain access to the group collaboration tool; being able to add messages, edit to-do lists, make entries into a shared calendar and so on—all of which could be viewed by the other members of the user group.

Thus, in use, a person carries a portable device; he connects it to the USB port of any internet connected computer; whereupon he is automatically logged into an online project collaboration tool for his user group via a browser, enabling him to share project information with the other group members privately over the internet; the other members having similar devices to log them into the project collaboration tool also.

Device 13 (USB Autorun Device Used as an Avatar and User ID (e.g. for IM Service))

Figure 13:
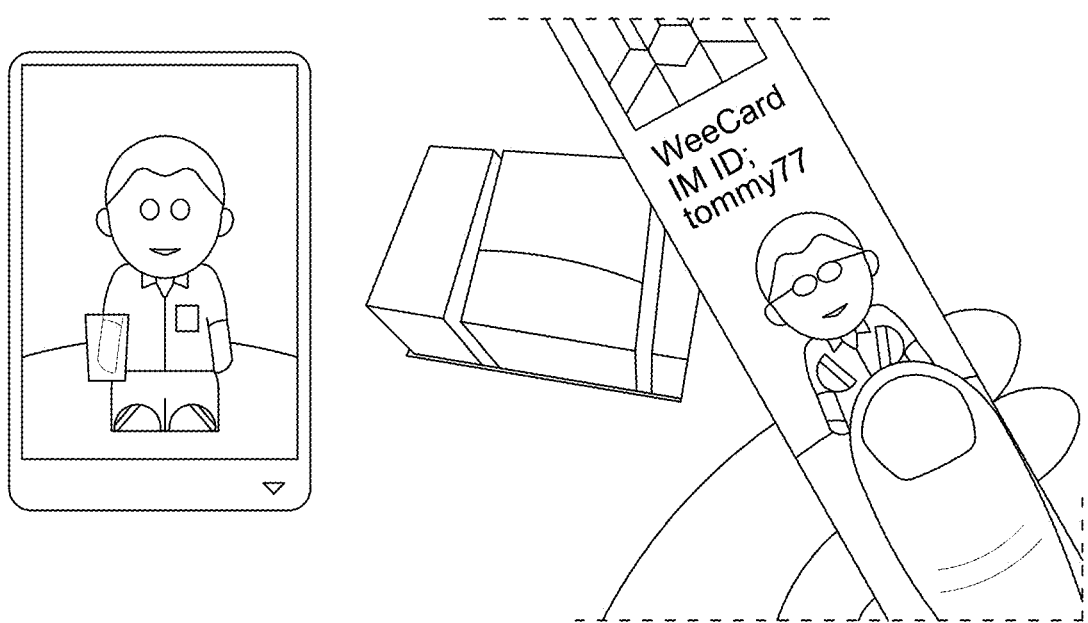
FIG. 13 is an example of a USB autorun device used as an Avatar and user ID (e.g. for IM service).

The USB autorun device could be applied as portable physical avatar, for example as a user's Instant Messenger alias. An example is shown in FIG. 13. When connected to a computer the device would autorun and open the URL of an online Instant Messaging service, such as MSN Web Messenger. A unique user ID and passcode would be appended to the URL and passed as parameters to the server, so that the user could be identified and thus login to the service; the user would thus be online, available to chat and his avatar would be displayed indicating that he is online. An example of the full URL might be:

http://webmessenger.msn.com/
  default.aspx?user=12340987&pass=046756

Thus, in use, a person carries a portable device; he connects it to the USB port of any internet connected computer; whereupon he is automatically logged into the Instant Messaging service and his avatar displayed as online, enabling him to chat with friends; the device having passed login information to the server.

Further to this, a set of similar devices could be given to people with whom a user wishes to "chat"; either existing members of his "buddy list" or people he wishes to join his list. When a recipient connects the device to a computer the device would autorun and open the URL of an online IM service, such as MSN Web Messenger. The user's ID would be appended to the URL and passed as a parameter to the server, so that the user ("buddy") could be identified. If the recipient was also a member of the IM service, they would automatically go online so that they can see the avatar of the user and whether they are online also. If the recipient was not a member of the service they would be directed to a web page offering them the option to sign-up to the service. An example of the full URL might be:

http://webmessenger.msn.com/buddy.aspx?user=
  12340987

Thus, in use, a person receives a portable device from another IM user (or "buddy"); he connects it to the USB port of any internet connected computer; whereupon he is automatically logged into the Instant Messaging service, the avatar of his "buddy" is displayed and he can see whether they are online or not.

In the second case the device acts as "physical avatar". If a user wanted to chat with one of their "buddies" they could select the device (probably in a card format) on which the buddy's avatar was printed and simply connect it to a computer to chat with them. Thus the device is a visual and physical reminder of the buddy, as well as direct access to the IM service.

Device 14 (USB Autorun Device Used as an Internet Radio (or Radio Station))

Figure 14:
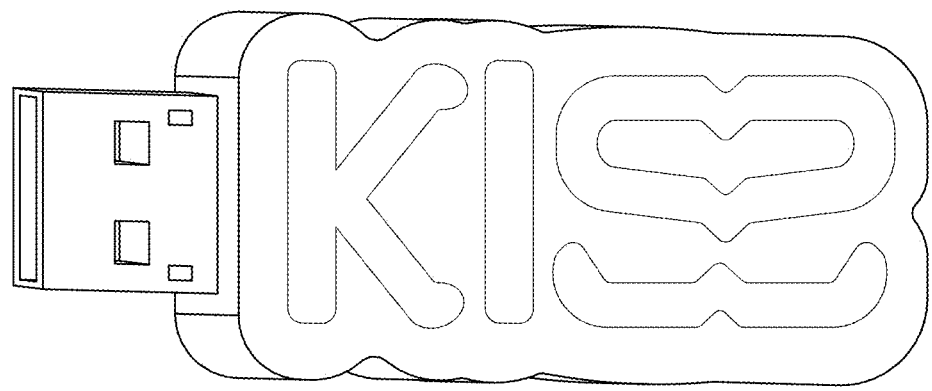
FIG. 14 is an example of a USB autorun device used as an internet radio (or radio station).

The USB autorun device could be applied as a portable internet radio or radio station, used to listen to live streamed radio on any internet connected computer. An example is shown in FIG. 14. Such an internet radio could be either a promotional, branded item, as in the case of a single radio station, or could be a more generic internet radio, being more product-like with access to any internet radio stream and having user presets. The internet radio could be purchased from a retailer, received with a paid subscription or given away free by an internet radio broadcaster.

In the case of an internet radio station, when connected to a computer the device would autorun and open the URL of the internet radio station. The URL would link to a live audio stream that could either be played within the browser or could automatically redirect to launch a software media player, such as Windows Media Player. Example URLs might be:

http://www.whatson.com/players/kiss/listen_live.shtml (plays in browser)
    http://www.emapdigitalradio.com/emapdigitalradio/metafiles/kiss100.asx (plays in WMP)

In the case of a generic internet radio, when connected to a computer the device would autorun and open the URL of an internet radio player. A unique device ID (or subscription ID) would be appended to the URL and passed as a parameter to the server, so that the device/subscriber could be identified. An example of the full URL might be:

http://launch.yahoo.com/launchcast/subscription/radio.asp?id=0467561209

An alternative version of a generic internet radio would not link to an online radio player via a URL but instead would use internet radio player software stored internally on memory within the device. The device would autorun and open the internal software. The user could then use the player to listen to internet radio.

For example, a person may wish to access their favourite internet radio stations at home, at work or while travelling. This is typically done using internet radio players accessed via an internet browser; the user is required to navigate to the various web pages of the radio stations. A USB autorun device would allow the person to access their favourite internet radio streams in a more direct, portable, tangible and intuitive way. When the user connects the device to the USB port of any internet connected computer, the device would autorun and open a URL with a unique device ID (or subscription ID) appended. The URL would link directly to the internet radio service and simultaneously pass the ID to the server so that the device/subscriber could be identified and a customised web page sent to the user's browser. The customised web page could for example display an internet radio player that would automatically begin playing the last station to which he was listening; it could also include the user's personal list of favourite radio station and a set of customised presets to quickly access his most frequently used stations. The internet radio service would store this customised information with the device/subscriber ID in a database on its server; whenever the user uses the device and then customises the internet radio in some way (e.g. changes a preset) the database would be updated.

Thus, in use, a person carries a portable internet radio device; he connects it to the USB port of any internet connected computer; whereupon a customised web page for the internet radio service automatically opens on the computer, enabling him to listen to his personal favourite radio stations; the device and the internet radio both appearing to be owned by and personal to the user.

Device 15 (USB Autorun Device Used as a Smart in-Store Product Tag)

Figure 15:
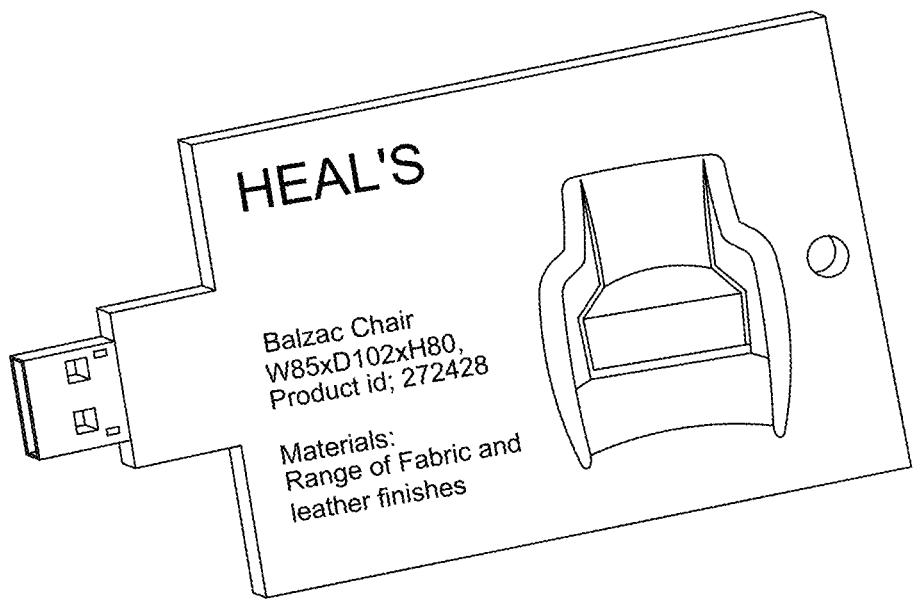
FIG. 15 is an example of a USB autorun device used as a smart in-store product tag.

The USB autorun device could be applied as an in-store product tag that would give direct access to online information relating to the product. An example is shown in FIG. 15.

While browsing the products within a retail environment a customer would be able to take away a very low-cost device that would autorun and open a URL when connected to a computer. A product ID number would be appended to the URL and passed as a parameter to a web server so that the relevant product could be identified. The URL would link directly to a page within the retailer's website that would give specific information relating to the product, such as price, ordering information, options and other related products. An example of the full URL might be:

http://www.heals.co.uk/bin/venda?productid=272428

For example, when a person is considering a purchase in a retail environment, they often want to make the final decision when they return home, perhaps after finding further information about the product. They may want to view options such as colour or the delivery time for a particular product, while at home. This is typically done by the customer remembering which product they were interested in, perhaps by its name or model number, and then using the retailer's website when they are at home. This can be a difficult and complicated process when trying to find information relating to the specific product of interest. The retailer may also want to encourage the customer to visit their website; the aim being to increase the customer's awareness of their online retail presence, or other products that may interest them. A USB autorun device, in the form of a smart product tag, would allow the customer to take away from the retail environment direct access back to specific information relating to a product, in a tangible and intuitive way. The customer would take away the smart product tag when browsing a product. When he returns home and connects the smart product tag to the USB port of his computer, the device would autorun and open a URL with a product ID number appended. The URL would link directly to the retailer's website and simultaneously pass the ID number to the server so that the product could be identified. The server would receive the passed ID number and look up the product in a database. A web page would be sent back to the customer's browser containing various information specifically relating to the product of interest, such as price, options, delivery time and so on.

Thus, in use, a person takes away a smart product tag while browsing a product in a store; he returns home and connects it to the USB port of his computer; whereupon a webpage automatically opens on his computer, enabling him to view information relating to the specific product he was interested in.

Device 16 (USB Autorun Device Used as a Loyalty Card)

Figure 16:
FIG. 16 is an example of a USB autorun device used as a loyalty card.

The USB autorun device could be applied as a portable loyalty card used both to access information relating to the customer's loyalty points (including options to redeem them at the retailer's online store or other stores) and as a way to collect loyalty points while shopping online. An example is shown in FIG. 16. The loyalty card could be given away free by a retailer and would be used to collect points both in the retail stores and when shopping online. When connected to a computer the device would autorun and open the URL of the retailer's website (online store). A unique user ID (card ID) would be appended to the URL and passed as a parameter to the server, so that the user could be identified. An example of the full URL might be:

http://store.tesco.com/loyalty?userID=12340987

For example, a person may wish to check or redeem their loyalty points using the internet or they may want to shop at the retailer's online store and collect loyalty points, as is done when shopping in a real store. A USB autorun device, in the form of a loyalty card, would allow the person to do both of these things in a tangible and intuitive way. When the user connects the device to the USB port of any internet connected computer, the device would autorun and open a URL with a user ID (card ID) appended. The URL would link directly to the retailer's online store and simultaneously pass the user ID to the server so that the user (card) could be identified. The online store server would thus verify that the card was genuine and the user would be able to view the loyalty points credited to the card, be given options to redeem the points or could start shopping at the online store (any purchases made would add points to the card; the card having been identified by the server).

Thus, in use, a person carries a portable loyalty card device; he connects it to the USB port of any internet connected computer; whereupon a web page for the retailer's online store automatically opens on the computer, enabling him to check, redeem and collect (by shopping at the online store) loyalty points; the device having passed a user ID to the server so that the card could be identified.

Device 17 (USB Autorun Device Used for a Food Delivery Service)

Figure 17:
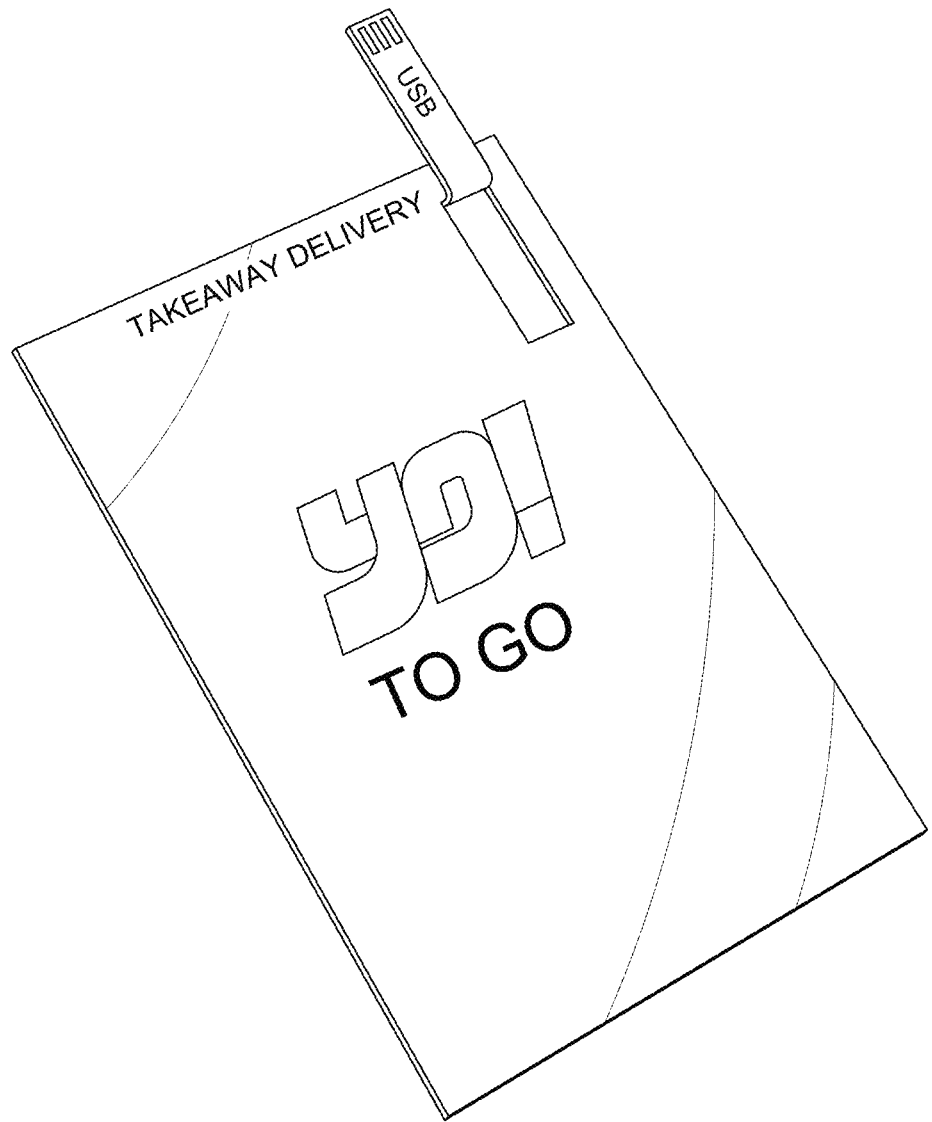
FIG. 17 is an example of a USB autorun device used for a food delivery service.

The USB auto-run device could be applied to ordering a take-away meal for delivery. An example is shown in FIG. 17. The device can be integrated into a promotional flyer as a flat component attached to print that can be folded out or removed for use.

It can become a quick-order menu. When plugged in it launches a browser and opens the website. The customer can then select their meal from an online menu and finally place the order. Payment is usually on delivery.

The fewest steps to order food are:
1. Plug in
2. Select food
3. Place order

In order to achieve a three-stage interaction the device needs to know the following essential information:
1. Are you in a delivery area?
2. The delivery address
3. Order verification/customer contact The amount of essential information that can be pre-linked to the device depends on how the customer obtained it.

Random distribution e.g. Newspaper or magazine
Local distribution e.g. Flyer through your post box or pick up at local restaurant.
Direct mail
Arrives with food
Random Distribution The first time the device is used all essential information needs to be input by the customer on the website e.g. postcode, house number, name, contact telephone. The second time the device is used (irrespective of the computer is being used) all the information obtained is in place, reducing the number of steps needed to place and order.

Local Distribution

The only difference to Random distribution is that the first time the device is used, the customer does not need to establish they are in a delivery area, they can be presented immediately with a menu. This is done by pre-linked IDs on flyers to the database of restaurants before distribution.

Direct Mail

All the essential information is in place and linked to the flyer but there may be a need for further customer verification.

Arrives with Your Food

All essential information can already be in place and the device is ready to use.

The device can be uniquely identified as part of the URL. This means it can be recognised by the company's server allowing it to be linked to the information known about the customer.

A USB autorun device used for food delivery would have the following advantages:
Tempting to use
New and novel
Less likely to be thrown away than a generic paper flyer
Quick to use and as easy as phone ordering
Does not require opening a browser
Does not require reading and writing a URL
Can be recognised from any computer, doesn't require a 'cookie'

The site might allow customers to speak directly to the take away company by opening an audio call through the internet. This makes the card feel like a quick way to make a free telephone call.

Device 18 (USB Autorun Device Used to Access a Secure Web Site)

Figure 18:
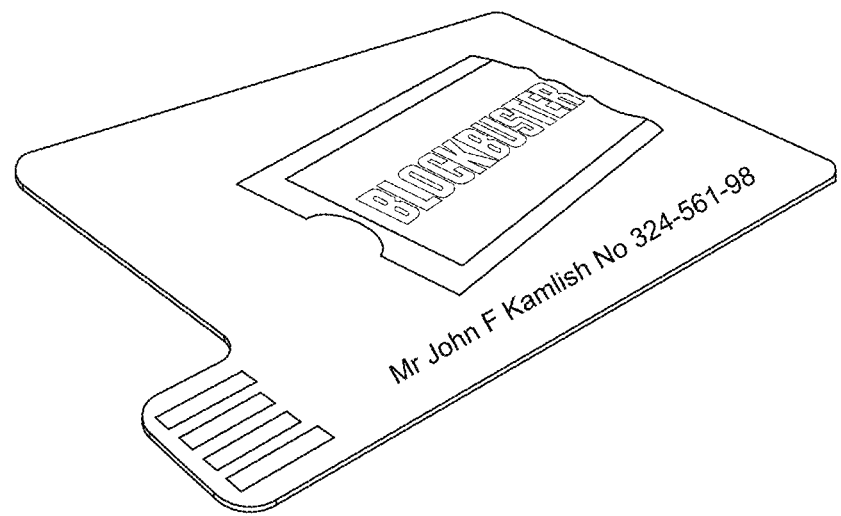
FIG. 18 is an example of a USB autorun device used to access a secure web site.

A USB device which can provide access to a private website e.g. a private club or viewing video. An example is shown in FIG. 18. The URL can not easily be saved or input via a keyboard. The USB device acts as 'web dongle' and ensures that only the owner/s of USB device has access.

Typically access to a secure site is done through typing in a URLs and then logging in by entering a password. Sometimes the URL is also deliberately difficult to find, stopping search engines finding it or accidental visitors.

A USB auto-run device can be used as a key to a private site. By inserting the USB key in to the computer a secure URL is delivered. The site does a security check on the data in the URL and if correct the site is automatically opened. The site can not be accessed without the key. The key is difficult to copy, limited to the physical number given out and can be physically withdrawn or deactivated online.

There are many cases where restricted access to websites is needed, this falls into two groups:

Restricted access to only those that have paid for the service.
For example:
TV, Films and music
News and finance (Reuters, FT)
Clubs
Restricted access to private information e.g. stop others tampering with it (privacy).
For example:
Company shared ftp sites and administrative access to website.
Project and group working
Loyalty schemes, air miles
Personal & financial information
Where personal information is held and restricted logon is required e.g. Oyster card top-up, paying congestion charge, virgin trains booking, Tesco shopping etc.

Some advantages of using physical USB auto-run objects are:
it travels with you but is not dependent on your computer
it's perceived as having value
status symbol
collectors item
you can sell it
you can control its distribution
has a level of security—like a key The amount of security needed is dependent on the intended use of the device and different applications need different levels of security.

Low Level or Basic:

Like having a complicated or obscure URL that you could never remember or be able to write down e.g. ytd7875687iuf.com Medium:

The device contains a password of some sort e.g. www.myclub.com?12368

High:

Very difficult to copy like a car key e.g. SHA1 encoding.

Typically the microprocessor in the device generates a new unique sequence of numbers each time it is used. This can only be predicted and recognised by the server which knows the initial seed.

Device 19 (USB Autorun Device Used to Access Specific Venue Information (e.g. Cinema or Specific Chain of Venues))

Even though cinema customers often know exactly which cinema/venue they wish to view. It is often difficult to find them on the internet as simple memorable URLs have been taken For example: www.Odeon_streatham.com does not take you to the Odeon in Streatham, it's correct and unmemorable URL is . . .

http://www.odeon.co.uk/fanatic/film_times/s130/Streatham/

Customers are forced to waste time going through generic portals like odeon.co.uk and laboriously navigate to the specific part of the site they are interested in, when they already knew which site they wanted to view.

By adding USB auto run to a cinema leaflet and giving them out, customers have a direct links to a specific venue on line. Inserting the USB part of the leaflet in to a computer, it auto launches the browser with a URL from inside the devices and takes the customer directly to the venue's site and the information they are interested in. The URL for the cinema does not need to be changed and the leaflet can be tracked to build up a profile of its use.

The USB device could be bonded to paper, a plastic cards or be physically similar to a USB memory stick. Graphically it needs to be identifiable and visually linked to the venue's site it will go to.

The URL given out by the device can also carry a unique identifier and be recognised by a script on the server. A profile of use can be built up over time and used for targeted marketing. With suitable security on the site it can be used to book tickets, potentially allowing one click booking.

Device 20 (USB Autorun Device Used to Access a Taxi Service)

Log in once to taxi firm and then the application provides instant taxi ordering. It is very common for taxi companies to advertise through credit card size flyers. These are often dropped through letterboxes, given to customers after a ride, picked up in public places like bars or added to publications. Some customers keep these in their wallet, but many have a specific place at home where information like this is stored like a pin board, fridge, hallway draw or folder with similar local information.

It is a competitive market and getting a customer to both keep and recognise the card could increase use and give a competitive advantage.

The printing on the cards often have several types of information including the services offered by the cab company and contact information. As well as telephone numbers taxis often now can be booked through the internet.

Figure 19:
FIG. 19 is an example of a USB autorun device used to access a Taxi service.

By adding the USB auto-run device to the taxi card, it can be inserted in the USB on a computer, auto open the browser to the taxi site and uniquely identify the card being used. An example is shown in FIG. 19.

This speeds up access to the site and acts like an internet cookie, so user information and their preferences can be pre filled in on the site page. The site might allow customers to speak directly to the taxi company by opening an audio call through the internet. This makes the card feel like a quick way to make a free telephone call.

The card can also act as an additional level of security for account customers e.g. the account customers company can limit who has a key, track the identity of who is making a booking and even allocate different keys to different jobs of the customers company. This would help tracking and billing the use of taxis to the taxi customer's clients.

USB is becoming more common on Mobiles and it is feasible for cards to be plugged in and directly dial a number (e.g. by using the GSM-AT command set or similar).

Device 21 (USB Autorun Device Used for Simple Computer Operation ("Computer Access for Dummies"))

Most things done on a computer require knowing how to manipulate the machine through a series of steps. To many people computers are only needed for a small number of applications and remembering all the steps needed to get to and launch them is a problem. To others manipulation of the mouse and keyboard are simply too difficult. Children can often use a simple program or game long before they can manipulate the OS/finder.

A USB object which is visibly descriptive of its function and when plugged in automatically configures the computer or opens an application would be very helpful. It carries out a series of commands which control the OS and/or applications to a specific state. This can be used to tailor a machine to a specific user or to tailor it to a place or institution e.g. a school or library. It also simplifies moving between shared machines where things are always located or in slightly different places.

They might be thin flat printed tags just thick enough to fit in to a socket or a more 3 dimensional plastic devices with full USB connector. Being a physical description of a piece of the software or process has the advantage of being physically distributed, portable and being descriptive of its function even when not near the computer.

The device is not limited to opening URLs. By emulating the keyboard it can do most actions carried out on a computer. It can act as a macro, mixing between the application and system level actions. E.g. plug it in and it opens a new page in word and then types in the letter heading. When a second device is plugged it saves to a specific folder and prints the document.

Types of action might be:

Take me to my URL and log me in to my . . . web mail, Flicker, Mixi, MySpace

Open the application . . . Word, Explorer, Lime wire

Go to my logon for . . . Amazon, iTunes, my cinema

Log into my . . . router, company ftp, web site server page

Show me my . . . school times, home work for biology

Go to . . . CBeebies web site (website for young children)

Open my . . . bank folder

Print to a specific printer and save to my . . . correspondence folder

Save and send this file to me by email

Device 22 (USB Autorun Device with Integrated RFID)

Users can not electronically read cards at home as they require specialist equipment. For example an Oyster needs an RFID reader, Bankcards needs magnetic swipe or a smartcard reader.

By combining existing card technologies with existing home readable computer technologies (USB, Bluetooth, wireless RF for keyboards), cards can become useful at home or work.

Often cards will perform different functions depending on the context they are read. For example Oyster cards, opens gates when placed on a turnstile but show account information and offer top up facility when touched on the ticket vending machine. At home a duel purpose card might offer either the same action as in normal use or different actions. It would be useful for a USB auto run Oyster card to log in to your oyster account, show the current balance, usage and offer top-up. Paying for Top-up might be done in several ways:

1. By typing in credit card information
2. If the credit card also has secure auto run USB, by plugging it in.
3. If Oyster already has your credit card information and the USB part of the Oyster card has suitable security by confirming your identity by simply typing in an additional password.

Device 23 (USB Autorun Device as a Toy)

Figure 20:
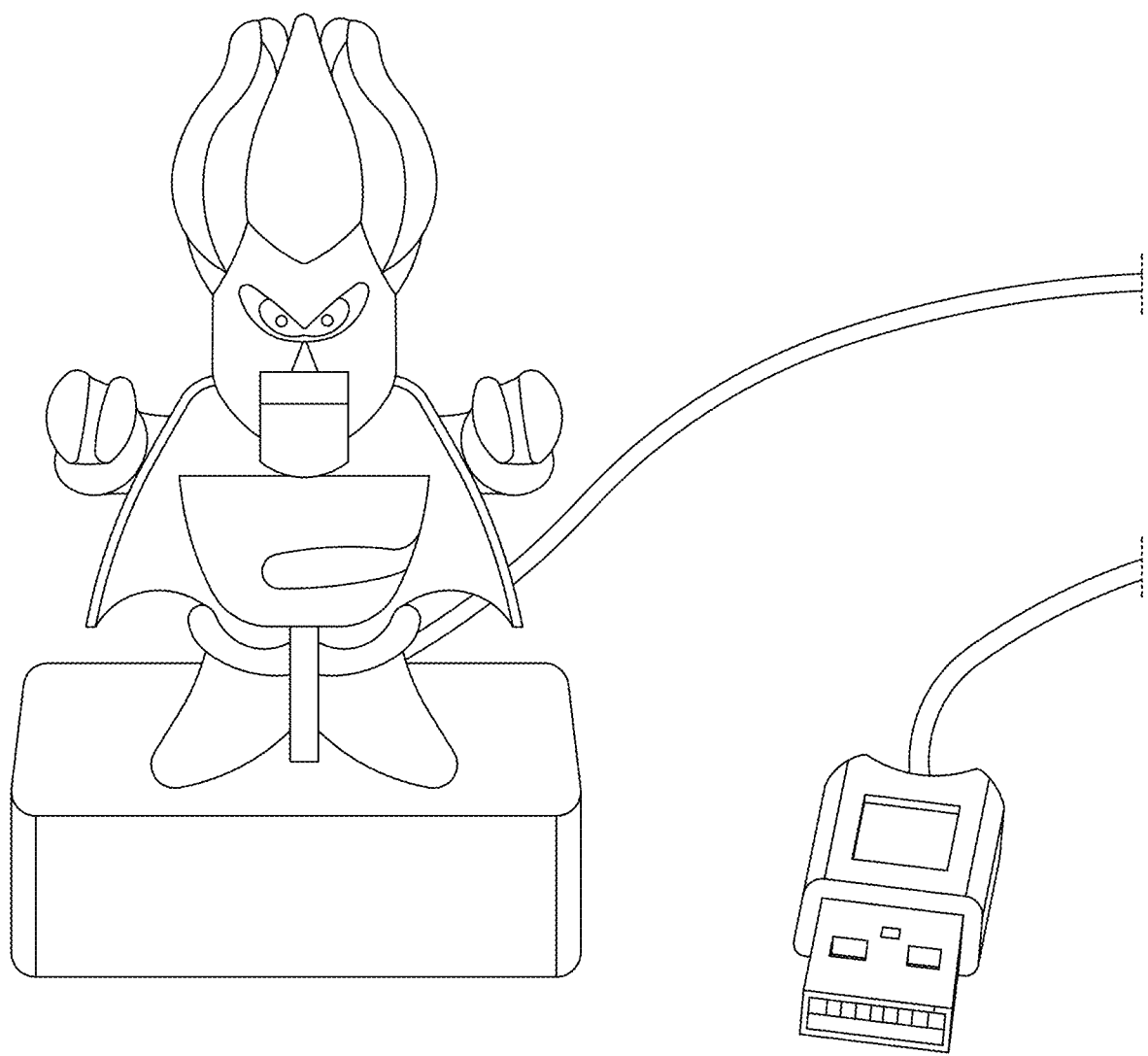
FIG. 20 is an example of a USB autorun device as a Toy.

There are many possibilities for toys which have additional USB auto run connectivity. An example of a USB autorun device as a Toy is shown in FIG. 20. The most important aspects of auto run on toys are:

Simplifying access for younger kids—just plug it in and it works.

Portability—take your toy to friend's house and continue the game online from where you left off.

Identification of the specific toy—the player and their state is retrieved for ongoing web game without the need to log in using passwords.

Input and output (IO) from the toy—the fluffy toy talks and moves its mouth when it is squeezed.

Identification with security—this allows subscription models for services like comics (e.g. access to media and data is only available via the toy).

Types of Toy:

Film Promotion Through a Character:

For example, A character from the film is distributed prior to the films release as part of the advance publicity. It might be bought or given away, for example with food packaging. When plugged in to the computer it outputs a URL, possibly with a tracking ID and loads a relevant web page over the internet. The page could contain audio, games, movie clips, competitions etc. The film character toy may also have additional TO as is listed below.

Subscription to Online Comic or Similar Kid's Media:

Each week it delivers the next episode. The auto-run device with ID acts as access to an online story or comic. The server tracks its use and releases episodes as required. The device might be bought giving access to a number of episodes or be given away showing an initial episode for free, by paying on line the story continues, unlocking several more episodes. The comic/media can be used on any computer with a suitable internet connection and when not in use can be shown off clipped to the kids clothing.

Board Game and Site:

A board game with auto-run is plugged in to computer; it outputs a URL, possibly with a tracking ID and the browser loads the relevant web page over the internet. The game is played on the board, but the board also acts as an input device to the web site. Input might be by having simple buttons built in to the board or recognising the position and ID of characters/tokens moved on the board, it might also include other TO as is listed below.

A simple example of a game is trivial pursuits connected to a web site. When a player lands on a question square the ID of the token is read by the board and data is sent to the site to prompt an audio question from the server or a button is pressed on the board by a player to prompt an audio question from the server.

Accessing Online Game Through Your Character:

The character automatically launches an online game and the kid then controls the character within the game using the normal input devices or the toy itself. An ID in the URL means the character could keeps its current state within the game. The auto-run devise might log the player in to a multiplayer environment game. Collecting different toys characters could launch either different games or different ways of playing the same game. Alternatively the auto-run devise might represent different types of equipment you use to play the game. Plug in wings and your character flies, plug in armour and it is extra resilient.

Activity Centre:

The physical toy with auto-run USB might be a toddler's activity centre (typically made by Fisher-Prise®) with different types of actuators. Plug it in (or use wireless USB), sounds and stories are heard when the toddler pulls and squeezes part of it, these are played via the computer. The sound might be sent back to the toy via the USB-audio profile.

Soft Toy:

The soft toy (plush) is plugged in to the computer on a long cable. The soft stroke able toy acts as an interface for a kid's site. By squeezing, stroking or moving its limbs the kid navigates and plays games on site. It acts like a dedicated mouse which auto runs a site.

Add-on to Existing Non Electronic Toys:

The USB can also act as an add-on to existing non electronic toys. The RSPB's soft toy bird, which play the correct bird sound when squeezed are commercially very successful. By adding an auto-run bird tag to their feet, the toy could take you to information about the bird and subscription to the RSPB kid's site.

Toy Jewelry:

A young girl's bracelet could hold a collection of USB auto-run trinkets. When inserted in to the computer they might launch games, stories or play music tracks off a site.

Input and Output that can be Added to a USB Auto-Run Toy:

Driving actuators on the toy, e.g. moving mouth driven by java within a web site (important).

Recognising characters placed on different bits of a USB board games.

Mixing USB auto launch with other USB profiles like the mouse e.g. our etch-a-sketch toy auto launches a site or local drawing app. The knobs then both acts as mouse movements and trigger mouse down for drawing. Sound might be sent back to the toy via USB-audio profile. Input on the USB toy might be bend, squeeze, hit, stroke or shake and incorporate sensors for flex, capacitance, heat, light, magnetic, tilt.

Device 24 (USB Autorun Device as an Intelligent Business Card)

Figure 21:
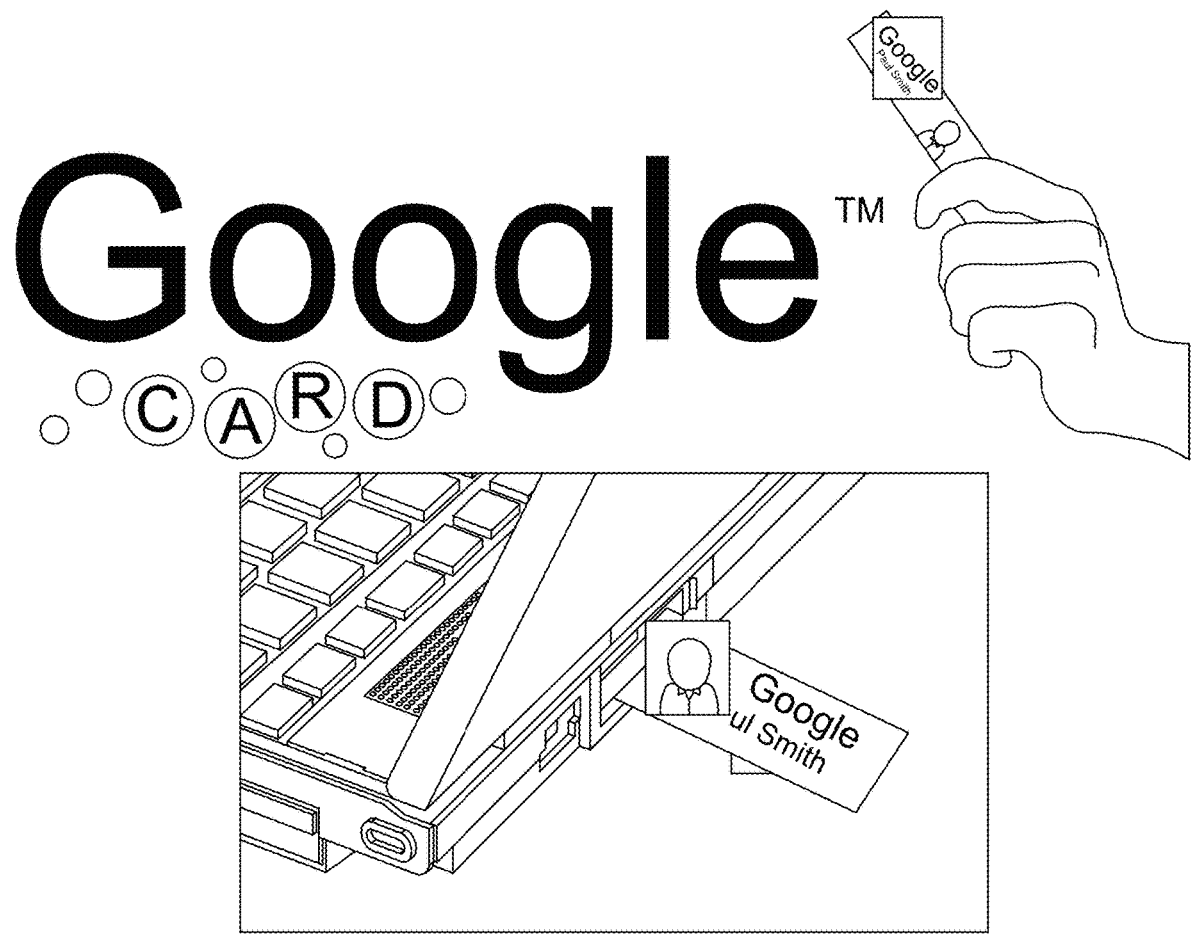
FIG. 21 is an example of a USB autorun device as an intelligent business card.
Figure 22:
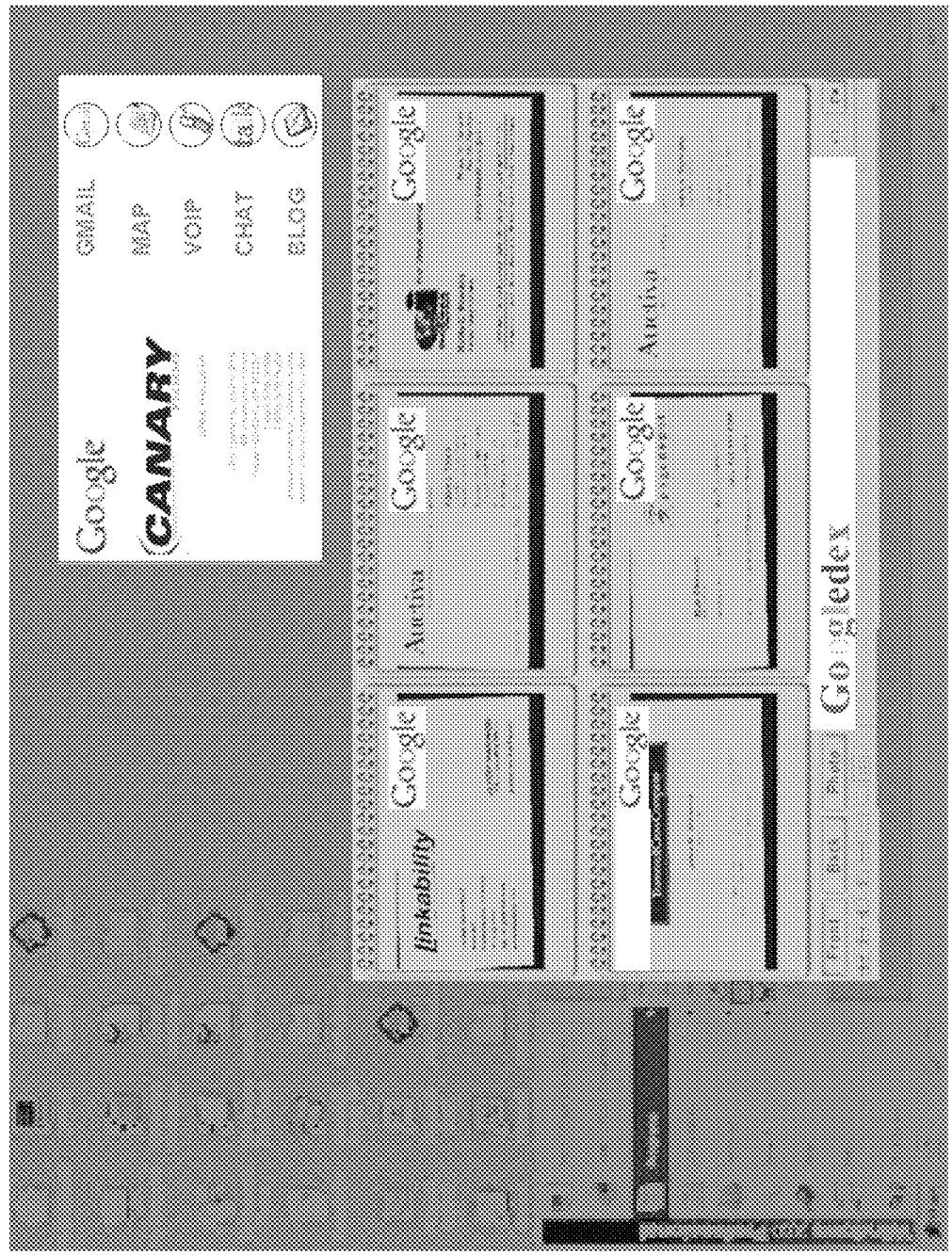
FIG. 22 shows intelligent business cards being automatically stored in the Googledex—with interactive cards that click through to application.
Figure 23:
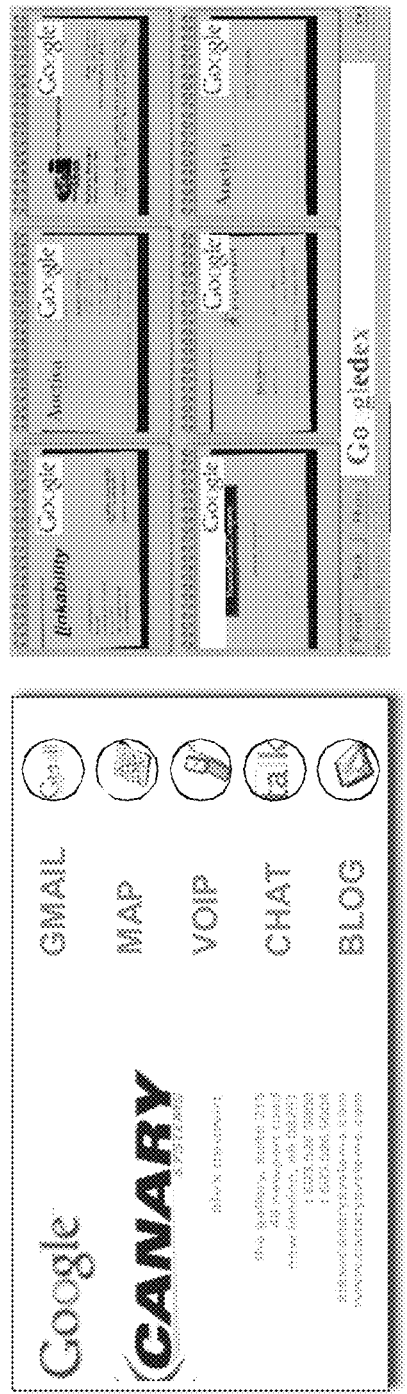
FIG. 23 shows parts of FIG. 22 in more detail.

This device type is show in FIG. 21 and its operation shown in FIGS. 22, 23. The USB autorun device could act as a personal or corporate business card—an "autocard". The card could contain just the name (or name and company for corporate use) and possibly image of the person. All the other details could be accessed once connected to a computer. The form factor of the device could either be a slim stick the length of existing business cards but a third of the width or it could be designed to be same size as existing cards to ensure compatibility with existing business card storage systems.

Each card would come with a unique ID internally stored. The level or amount of contact details could be determined by colour coding on the card—for example grey=business details, green=private contacts, red=private and personal details. So business details could include business and office details and contacts website. Private details could include mobile number and home address and personal contacts might include blog site, private web site chat details and blog details. At the point the recipient of the card connects to their computer then either; a) an e-mail notice is sent to the provider of the "autocard" enabling that card to be registered to particular person, or b) at the point that they make contact by e-mail then the recipients' details would be passed to the original provider of the "autocard".

At any point in time the provider of the card can supply the holder of their card with updated details if they change their position within a company, change company or change any of their contact details. The card can be given access to additional contact information if for example the recipient has business contact details but subsequently the provider of the card wishes to provide private contact details, There could also be a message window on the "autocard" once connected online. This enables the original provider of the "autocard" to send out messages such as they are away on holiday or attending a trade show with hotel contacts etc.

CD Business Cards already exist—so we should review this technology. These are credit card sized CD-ROM that will play in any standard computer CD drive. They are currently still more expensive than a normal CD, but the prices are becoming lower as manufacturers gear up for larger production runs. There appears to be two types of card; CD-R recordable cards and CD ROM factory produced cards. For quantities greater than 500 of one single design and dataset the CD ROM is an appropriate option, but for quantities of 500 or less the CD-R is the practical choice. CD business cards work just like a normal CD and can contain whatever information you wish to put on them up to the capacity limit of the disc (typically a maximum of about 45-50 MB, or about 35 floppy discs). The CDs will work in most standard PC, MAC or laptop CD/DVD drive.

An example of how the "autocard" business card could be used by companies with existing e-mail and contact services might be a company like Google. The "autocard" could support the existing Google communication services like: Google mail/Google maps/Google chat. By inserting the USB card the details of that contact would be automatically loaded into a "Google card index"—one click link to gmail/chat/map/VoIP/blog. Activating these will send your Google card to recipient. An example is shown in FIG. 21.

An extension to this idea is the concept of an automatic software rolodex application called "AUTODEX" that would be like filing system Continuing the example above with the Google card then the "AUTODEX" application—perhaps called "GOOGLE-DEX" when a usb "autocard" is connected to PC then this would automatically insert a new card into the "AUTODEX" with all the contacts that have been authorised by the user. An example is shown in FIG. 22, which shows cards being automatically stored in the Googledex—with interactive cards that click through to application. FIG. 23 shows parts of FIG. 22 in more detail.

There is also the possibility that RFID may be embedded within the business card.

Device 25 (USB Autorun Device as an Internet Shopping Coupon Enabler)

Figure 24:
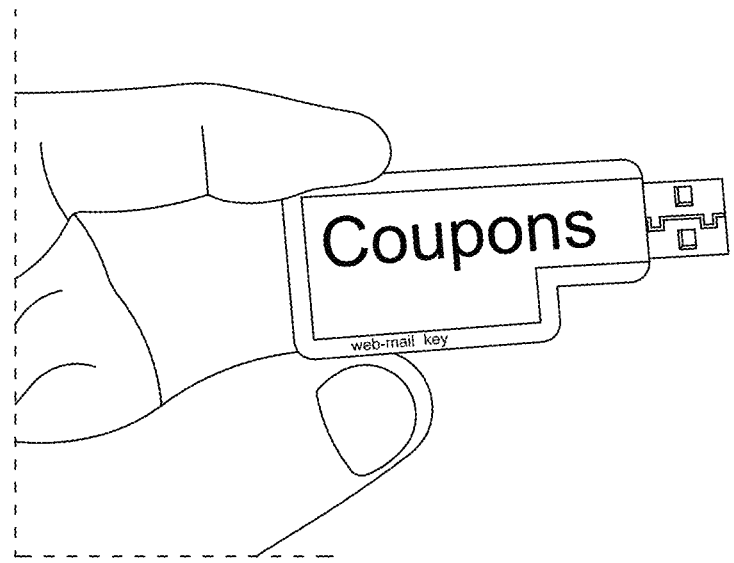
FIG. 24 is an example of a USB autorun device as an internet shopping coupon enabler.
Figure 25:
FIG. 25 shows examples of shopping coupons, which could be supplied by a USB autorun device as an internet shopping coupon enabler.

This device type is show in FIGS. 24, 25. The USB autorun device could act as a key or access to dynamic internet shopping coupons. An example is shown in FIG. 24. The USB device connected to a PC would provide the user with an electronic version of the coupon pages that appear in the US newspapers or the coupon leaflets or coupon books that are provided to consumers particularly in the USA. Examples of such pages are shown in FIG. 25. The web page/application that would be opened automatically could have multiple sections/pages—so providing easy navigation to coupons for different product categories from food to electronic goods, and from holidays to meal offers and discounts.

By inserting the USB autorun device the user is taken straight to a coupon browser that would be always updated so as coupons 'expire' (since coupon discounts and offers are typically valid only for a limited period) they would not appear on site. The USB autorun device would also have a unique ID. It would build up a profile attached to this ID as the USB autorun device would be able to keep track of the coupons that are used or the offers that interest the user. This provides the opportunity for customised coupons (rather than generic coupons available to all) that could be offered to a single user alone (although that user may not be aware of this) to entice the user back into a particular retail outlet or online store.

On the coupon browser/application there would appear links when online commerce sites are available that would provide the ability to make a rapid purchase with the coupon discount applied. However some coupons would need to be printed—so these would have a print now button or save in my personal coupon book for later printing. You would need to ensure that a coupon can only be printed ONCE—as the unique ID is held on USB device it is possible to delete this offer once a print requirement has been made. It would also be necessary to make sure that the coupon printed cannot be photocopied easily—so therefore ensure image is hard to photocopy). The newspaper coupons could be displayed in a similar format as they appear in newspaper and printed and cut out. Visible Computing would receive referral/affiliate fee for all coupons accessed through this device.

Device 26 (USB Autorun Device as an Automatic Parcel/Shipment Tracking Key "AUTOTRACK KEY" (Also Includes "Auto Call-Back Key" Concept))

The USB autorun device could act as an automatic parcel/shipping & tracking key. The USB key would be loaded with an account number (the id can directly relate to an account number).

The best way for this to be activated would be for the shipping company (Federal Express for example) to issue the keys to their customers preloaded with their id—the list of id numbers would be recorded against the particular shipping account number. So for example the shipping company could issue 10×id numbers against a single account number.

Figure 26:
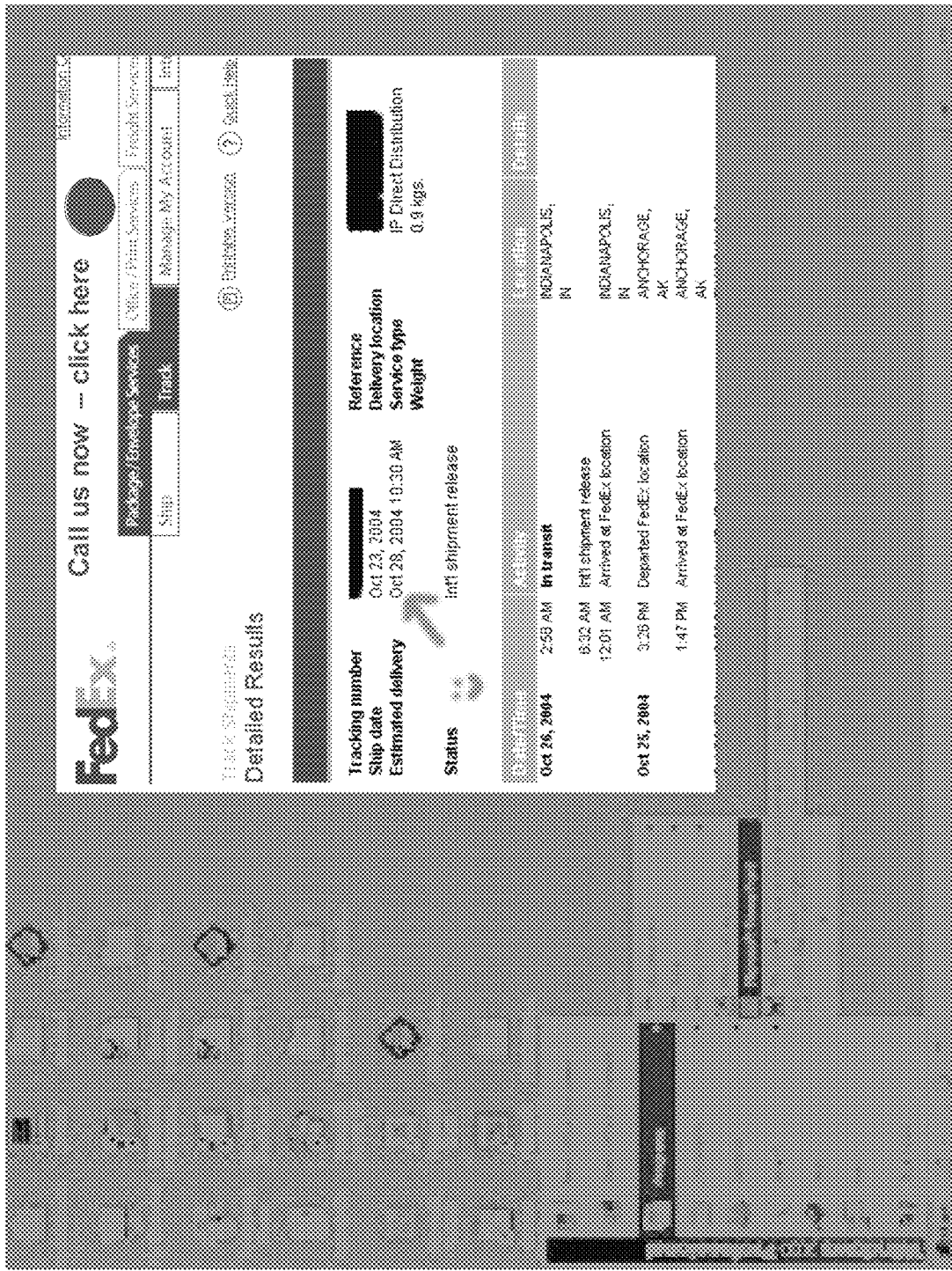
FIG. 26 is an example of a computer screen generated by a USB autorun device as an automatic parcel/shipment tracking key "AUTOTRACK KEY" (also includes "auto call-back key" concept).

The user issued with one of the usb "AUTOTRACK" keys just inserts the key into PC and a web panel appears that might have just two buttons—"track my shipments"—"arrange for pick-up" (if both these options are available to that account). An example of an implementation is shown in FIG. 26.

As the user details are preloaded as soon as the device is inserted it provides immediate status on current deliveries being tracked . . . or the ability to book a shipment.

(NOTE: the USB could provide an instant call back to a particular telephone number—on the internet this already exists—to use the service you put a hot linked button on your website. Customers who press this button (which invokes a JavaScript routine) can request an instant telephone call back. When pressed, the button invoked a popup window, which asked the user questions including their name and phone number (including extension). The button can be configured with a supplied setup wizard set to ask multiple-choice questions, check off boxes, or plain text. A name and valid area code and phone number are required to process the call back request. The user can request an immediate call back or request to be called back after a specified period of time in case they need to finish their online session first. With the 'link-it' USB device, a supplier could load a customers telephone number on that device and now anywhere that user is (assuming a mobile number is used) you would get a call at the supplier's cost. This could also be attractive for mobile phone operators who could run a service so that the USB device is used as an "I'll call you" card. Once someone inserts the USB device the call is made at the expense of the provider of the USB device.)

Device 27 (USB Autorun Device as an Online Credit Card)

An increasing number of credit card transactions are undertaken online but the danger of credit card fraud online exists just as it does in the high street. Fraud costs the economy an enormous amount: in 2000 a report estimated the cost of fraud in the UK alone to be in excess of £14 bn a year. And the figure is likely to be much higher now. Plastic card fraud alone in the UK cost £439.4 m in 2005. The USB autorun device could be used to introduce another simple level of security The USB autorun device could act as a personal or corporate id/or hardware pin. Online sites could introduce an auto-fill window on the online credit card transaction pages. By inserting the USB device the pin number would get auto-completed or would enable you to enter the number through typing BUT without the key it would not be possible to insert any pin number. This would ensure that the hardware key is required to make the transaction and even if someone knew your pin number it would not be valid without the USB device. If the hardware USB device is lost this can be reported and the unique id associated would be invalidated making the card useless. The card could be plan with no name so that if it was lost anyone finding the device would be unlikely to know who it belonged to.

Visible computing could make a small commission taken from credit card/or merchant company as this would save the company money through avoidance of fraud and also provide their customers with greater confidence.

Figure 27:
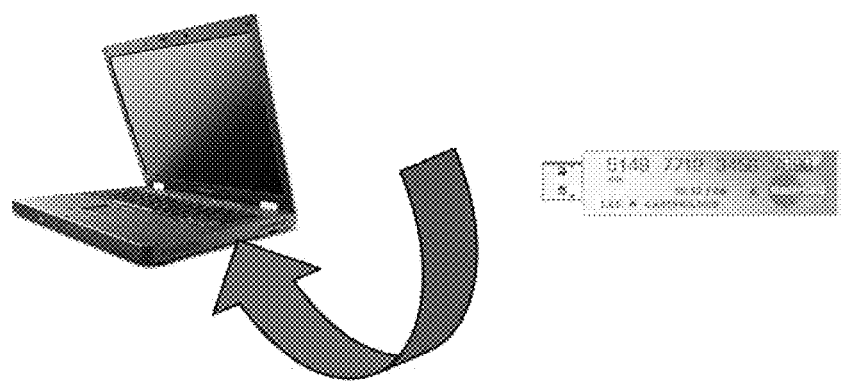
FIG. 27 is an example of a USB autorun device as an online credit card.

The USB autorun device could also act as a credit card either as a duplicate device with details for use on line, or could be in same format as exiting credit cards except that it would include a USB connector. So it could be used for normal chip and pin use in retail stores/restaurants etc but connected when making transactions online to verify pin number, provide greater security and perhaps also auto fill online transaction forms to make purchasing online not only safer but faster and easier. The cost would be extremely low since the existing chip on the chip and pin card would be used and just the USB connector would be the additional cost. An example is shown in FIG. 27.

In addition the inserting the USB credit card could provide you with direct access to your account details (after verification of pin number) making this a very useful way to manage your credit/cash-flow. This USB credit card could also be linked to your bank to provide instant access to your account for online banking.

Figure 28:
FIG. 28 is an example of a USB autorun device as an online Travel Card.

An example of a Oyster Travel card with a USB connector is shown in FIG. 28.

Device 28 (USB Autorun Device as Fast Process to Make Purchases Online. ("ZERO CLICK" PATENT or "ONE PUSH" PATENT or "AUTO-CART" PATENT or "AUTO FILL" or "PAYFAST" Patent Concept))

Figure 29:
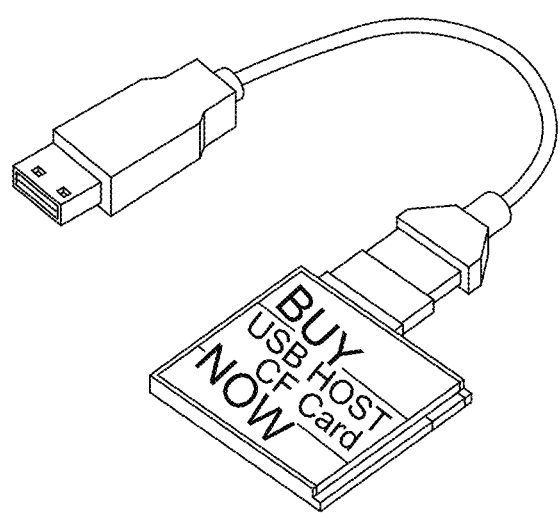
FIG. 29 is an example of a USB autorun device as fast process to make purchases online. ("ZERO CLICK" PATENT or "ONE PUSH" PATENT or "AUTO-CART" PATENT or "AUTO FILL" or "PAYFAST" patent concept).

This device type is show in FIG. 29. The concept is that the USB device inserted into your PC will already contain your password/address/credit card details etc so it would be possible to go to an online store and it would not be necessary to complete most of the transaction information you could go straight to the item you want and just buy it by inserting the USB device. So this would be like a "ZERO CLICK" concept for shopping).

Although one way would to achieve "zero click" would be that when you have found an item online—you insert the USB device and it then launches its window and fills in the details of the forms and credit cards there could be other ways to make a fast purchase with a USB device. Another way for example to achieve "ZERO CLICK" may be to have a button (or a key code) on a USB lead that when pushed buys the product selected. An example device is shown in FIG. 29.

Another way to achieve this rapid shopping online might be to regard the patent as facilitating an "automatic shopping cart" for online purchases. The concept would be that it fills in the shopping cart as a background task and skips straight through to the final stage—so providing "AUTO-CART" functionality. Alternatively the USB could act as an "AUTO-FILL" or "PAYFAST" "FASTTRACK" device so that when ever you have forms for address and credit card if the USB is connected it actually auto completes the text required.

The proposition to online merchants would therefore be that once a customer has registered with them that they could send them the "PAYFAST" device with their first purchase—they will have therefore have verified their name, shipping details and credit card details. The USB autorun device would therefore already be reloaded for that person and when they logged on to the merchants site they could use the "PAYFAST" By inserting the USB device they will automatically get logged onto the site with their personal profiles etc updated and be ready for "PAYFAST" experience for any new purchases.

This patent concept could be combined with concept 27 USB online credit card and/or concept 29 payments using USB device.

Device 29 (USB Autorun Device as Method of Payment Online)

Figure 30:
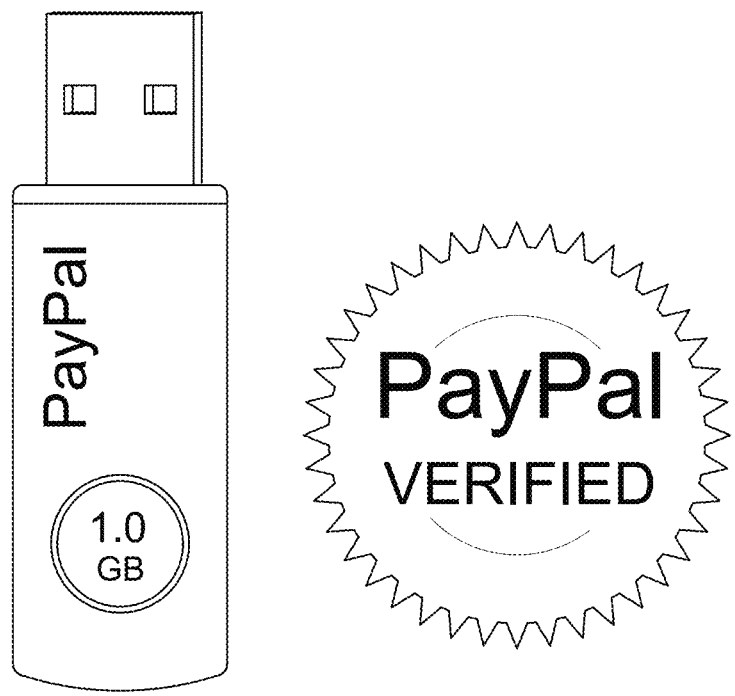
FIG. 30 is an example of a USB autorun device as method of payment online.

This device type is show in FIG. 30. An extension of the USB credit card (device 27 above) is to make the USB device a hardware key for online payment services. An example of the type of service that it could enhance is that of PayPal®:

Founded in 1998, PayPal, an eBay® Company, enables any individual or business with an email address to securely, easily and quickly send and receive payments online. PayPal's service builds on the existing financial infrastructure of bank accounts and credit cards and utilizes the world's most advanced proprietary fraud prevention systems to create a safe, global, real-time payment solution. The simple idea behind PayPal—using encryption software to allow people to make financial transfers between computers—has become one of the world's primary methods of online payment with 100 million account members worldwide. Available in 55 countries and regions around the world, buyers and sellers on eBay, online retailers, online businesses, as well as traditional offline businesses are transacting with PayPal.

So using PayPal as the example it is worth reviewing how this payment system currently works:

PayPal is an online payment service that allows individuals and businesses to transfer funds electronically. You can use it to pay for online auctions, purchase goods and services, or to make donations. You can even use it to send cash to someone. A basic PayPal account is free. You can send funds to anyone with an e-mail address, whether or not they have a PayPal account. They'll get a message from PayPal about the funds, and then they just have to sign up for their own account.

Funds transferred via PayPal reside in a PayPal account until the holder of the funds retrieves them or spends them. If the user has entered and verified their bank account information, then the funds can be transferred directly into their account. There are also other ways to withdraw your funds.

PayPal presents their presence as an extra layer as a security feature, because everyone's information, including credit card numbers, bank account numbers and address, stay with PayPal. With other online transactions, that information is transmitted from the buyer to the merchant to the credit card processor.

The PayPal system is still open to fraud. After a series of scams, PayPal formulated a plan to prevent criminals from using computer programs to open dozens of fraudulent accounts with stolen credit card numbers. This system, known as the "Gausebeck-Levchin" test, is now widely used by thousands of Web sites. It requires new account creators to type in a word found in a small image file on the account creation page. A script or a bot can't read this word—only a human can decipher it.

However, the use of a USB device as a hardware "PayPal" key for online payment services provides another level of security—as only the owner of the key can make the transaction when connected to a PC and if lost can easily be deactivated. It also enables a faster service and more convenient way to make the transaction. An example is shown in FIG. 30.

Device 30 (USB Autorun Device as Way to Launch Specific Adverts and Generate Loyalty Points)

The USB autorun device could act as a hardware "cookie" that could track where you go and provide information about what you request etc., but would do so with the permission of the user as they would be receiving some benefit from providing this information. The USB device would launch a pop up window that gives you a series of adverts and promotions that relate to your interests and an easy way to respond to these offers. In exchange for having the USB device inserted and for providing this information you would receive discounts or coupons against products and services.

Device 31 (USB Autorun Device as Key to Facilitate Digital Rights Management (DRM) (for Purchase of and Use of Software, Audio, Video and Print Products))

Digital Rights Management (generally abbreviated to DRM) is any of several technologies used by publishers (or copyright owners) to control access to and usage of digital data (such as software, music, movies) and hardware, handling usage restrictions associated with a specific instance of a digital work. The term is often confused with copy protection and technical protection measures (TPM). These two terms refer to technologies that control or restrict the use and access of digital media content on electronic devices with such technologies installed, acting as components of a DRM design.

Figure 31:
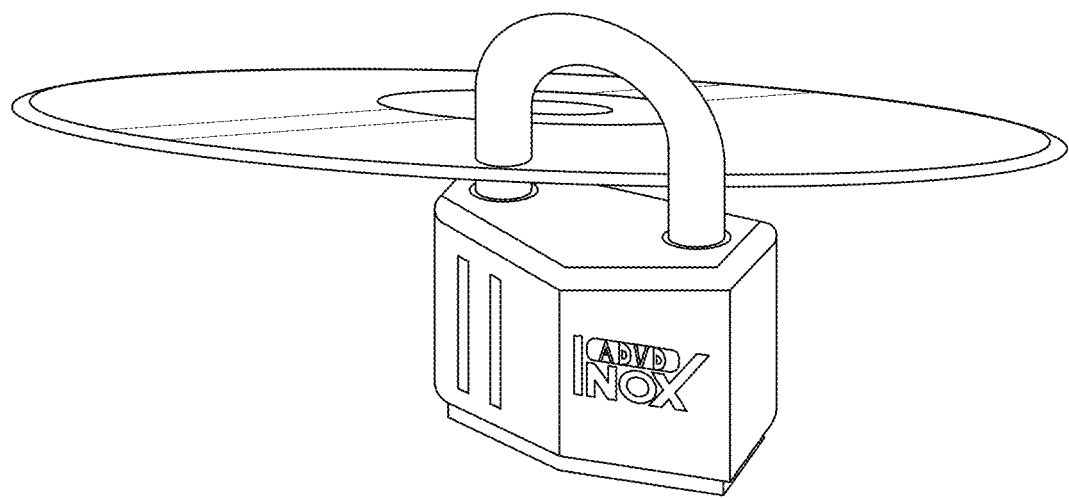
FIG. 31 is a schematic example of a USB autorun device as key to facilitate digital rights management (DRM) (for purchase of and use of software, audio, video and print products).

The USB key provides your DRM key or other identifier—digital rights management for all of your legal content. It could also support multiple DRM standards. As a portable device it could be taken with you to access music DVDs etc that you have the rights to but play and listen on another Pc or media playing device with USB support. The concept is illustrated in FIG. 31.

Device 32 (USB Autorun Device as DVD/Book/Music Club Key and Subscription Services)

Figure 32:
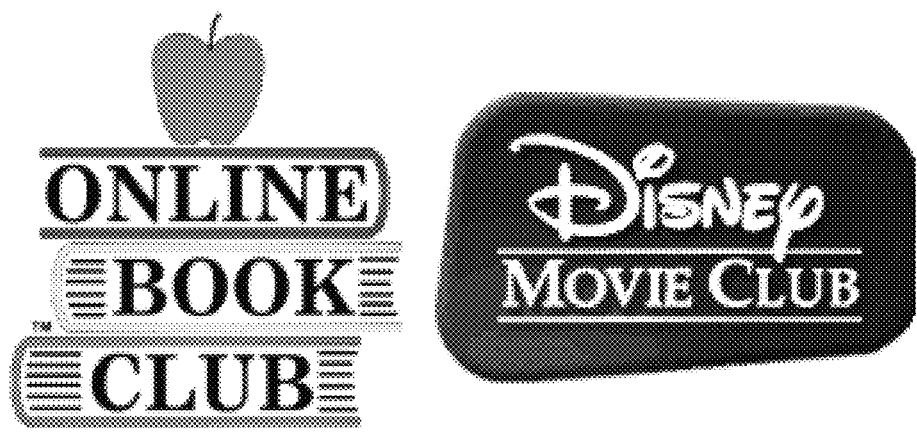
FIG. 32 are example of DVD/book/music club key and subscription services which may be accessed using a USB autorun device.

The USB autorun device could act as a personal tracking/access device for membership and subscription clubs. Examples are shown in FIG. 32.

Current book and DVD clubs often get you to sign up and then receive free DVDs or books if a commitment is made to a monthly purchase of new releases over an agreed period of time. The USB key would provide direct access to your personal account and enable to choose what is on offer each month to fulfill your monthly purchasing commitments. All of your account details would be stored on this device and password to a particular member's site. Any loyalty points/discounts could be offered and stored on the key also.

This concept also covers the ability to access the DVD rental services.—so again insertion of the USB key gives you an instant access to your DVD rental account and also your movie watching profile.

Device 33 (Copyright Protection for a USB Autorun Device in Shape of a Casino Chip for Gambling, Gaming, Casino Related Applications)

Figure 33:
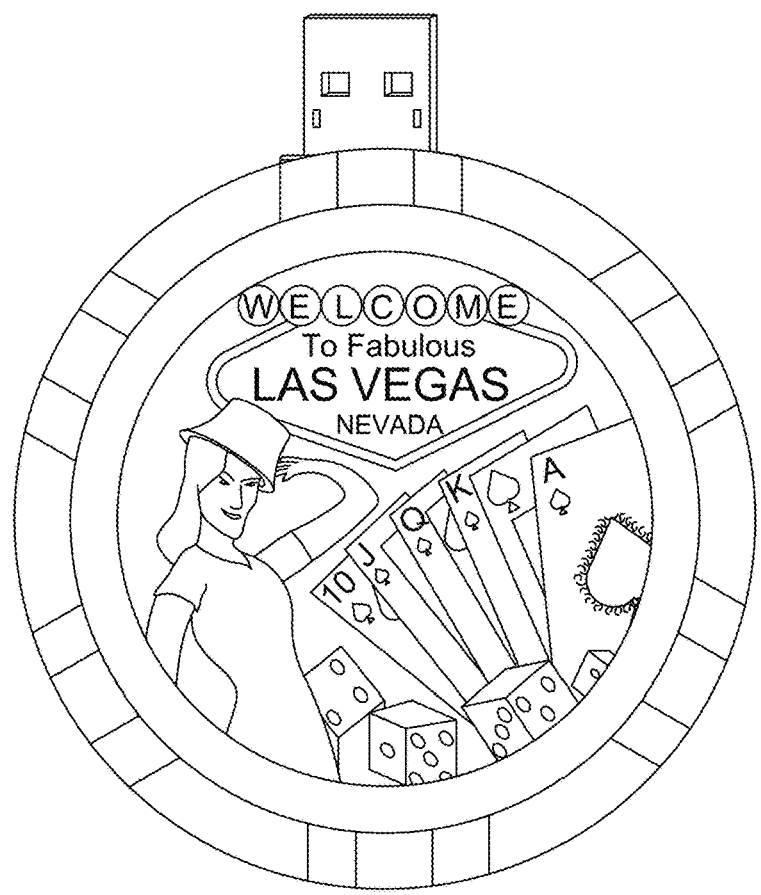
FIG. 33 is an example of a USB autorun device in shape of a casino chip for gambling, gaming, or casino related applications.

The USB autorun device could be produced in a form factor that reflected its application. In the case of a device that provides access to either an internet gambling site or a loyalty/membership club for a casino group it could designed as a casino chip. The chip could also contain a value say US$10 that would provide you with $10 of credit for that particular internet gambling site or $10 discount off that club's services or products. FIG. 33 shows an example of such a device.

Device 34 (USB Autorun Device Incorporating a Feature to Auto-Launch Multiple URLs)

The USB autorun device can incorporate a feature to auto-launch multiple URLs. A number of buttons could be included in the device which, when pressed, would cause the device to auto-launch a different URL for each button. Each URL could be a different web site or different pages within the same web site.

Figure 34:
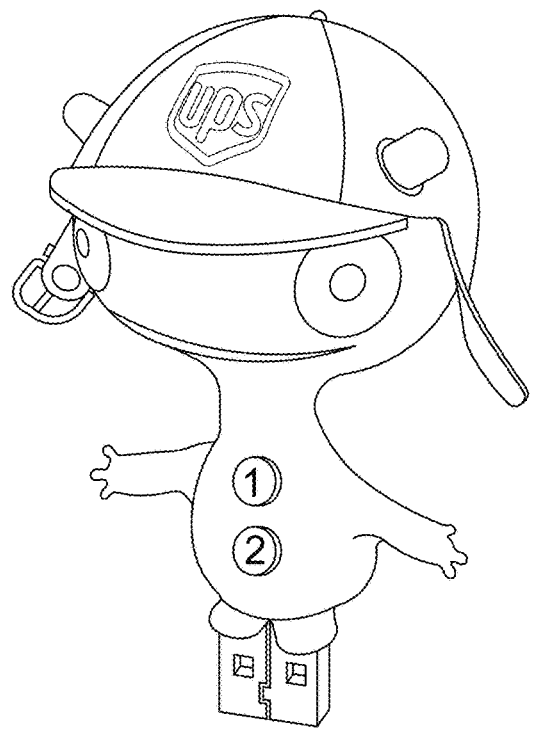
FIG. 34 is an example of a USB autorun device incorporating a feature to auto-launch multiple URLs.

For example a physical 'Widget' for a delivery service could be produced which incorporated a set of quick-link buttons. The 'Widget' could be given to existing customers or ordered from the delivery company. The user would have a physical reminder of the company as well as a tangible and direct way of accessing their online services. The quick-link buttons could give direct access to services such as shipment tracking, booking a pickup, or pricing tools. FIG. 34 shows an example of such a device.

An ID number could also be appended to the URL launched by each quick-link button. The ID would be passed as a parameter to a web server so that the 'Widget' could be identified. An example of the full URLs might be:

https://www.widget.ups.com/track/identify.cgi?id=12340987
https://www.widget.ups.com/ship/identify.cgi?id=12340987
https://www.widget.ups.com/price/identify.cgi?id=12340987

For example, when the customer connects the USB 'Widget' to the USB port of his computer, the device would autorun and opens an initial URL with an ID number appended. The URL would link directly to the delivery service website and simultaneously pass an ID number to the server so that the 'Widget' could be identified. The server would receive the passed ID number and look up the user in a database. A customised web page would be sent back to the user's browser welcoming him. At a later time, with the device still connected, the user could then quickly access different delivery services online just by pressing one of the quick-link buttons on the device; each button causing a different URL to be auto-launched.

Thus, in use, a person receives a 'Widget'; he connects it to the USB port of his computer; whereupon a customised webpage automatically opens on his computer. He can then use the buttons on the device to directly access different services online.

A feature for auto-launching multiple URLs via simple user input (e.g. buttons) could be used for many different applications. Another example is an internet radio, where each button is a preset radio station chosen by the user online; or alternatively one button could launch a radio station directory page while another could launch a radio player page for playing radio stations previously chosen from the directory.

Device 35 (USB Autorun Device Used for a Product Promotion)

Figure 35:
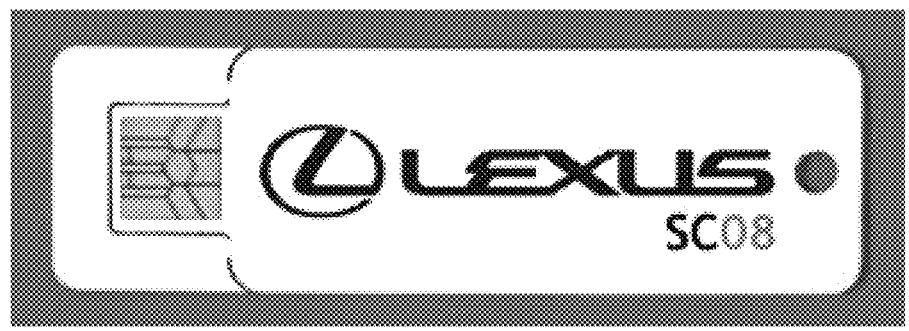
FIG. 35 is an example of a USB autorun device used for a product promotion.

The USB autorun device could be applied as a product promotion card or flyer. It would give direct access to online information relating to the product. FIG. 35 provides an example of such a device. While browsing the products within a retail environment a customer would be able to take away a very low-cost device that would autorun and open a URL when connected to a computer. The URL would link directly to a page within the product manufacturer's website that would give specific information relating to the product, such as price, ordering information and options. An example of the URL might be:

http://www.lexus.com/models/SC/

An ID number could be appended to the URL and passed as a parameter to a web server so that the device could be identified by the server. This could be used to identify the product; enabling product specific information to be displayed in the web page. An example of the full URL might be:

http://www.lexus.com/models/SC/product.cgi?id=00002345

The ID number could alternatively be used to associate user specific data to the use of the device. For example, customers could pick up a device at a car fair and connect it to a kiosk or PC displaying an online car configuration tool. When the customer is finished exploring the options for the car using the configuration tool, they could take away the device which would allow them to link back to a website showing the car they were interested in and the options they had chosen. An example of the full URL launched by such a device might be:

http://www.lexus.com/configurator/identify.cgi?id=38591209

For example, when a person is considering buying a car, either in a retail environment such as a dealership or a trade fair, they often want to find out more about the cars that interest them when they return home. They may want to view options such as colour or trim options for the car, while at home. This is typically done by the customer remembering which car they were interested in, perhaps by its name or model number, and then using the manufacturer's website when they are at home. This can be a difficult and complicated process when trying to find information relating to the specific car and options. The retailer may also want to encourage the customer to visit their website; the aim being to increase the customer's awareness of their online presence, or other products and services that may interest them.

A USB autorun device, in the form of a product promotion, would allow the customer to take away direct access back to specific information relating to a product, in a tangible and intuitive way. The customer would take away the product promotion card and upon returning home would connect it to the USB port of his computer. The device would then autorun and opens a URL with an ID number appended. The URL would link directly to the manufacturer's website and simultaneously pass the ID number to the server so that the product could be identified. The server would receive the passed ID number and look up the product in a database. A web page would be sent back to the customer's browser containing various information specifically relating to the product of interest, such as price, options and so on.

Thus, in use, a person takes away a product promotion card or flyer; he returns home and connects it to the USB port of his computer; whereupon a webpage automatically opens on his computer, enabling him to view information relating to the specific product he was interested in.

Device 36 (USB Autorun Device Using One-Time-Only Data)

For security purposes the autorun device could include one-time-only (OTO) data in the URL so that a device can be authenticated by a server. That is, part of the URL would change on each connection of the device e.g.

http://www.domain.com/index.php?id=2413&code=7980 (where 7980 is OTO)

This could be done in one of three ways.

1. A URL is sequentially read from a list of URLs, each with a different number. The URL would not truly be OTO but with a suitable list length this would be acceptable. The list of URLs would need to be protected.

2. A number is sequentially read from a list of different numbers, and then appended to the base URL. The URL would not truly be OTO but with a suitable list length this would be acceptable. The list of numbers would need to be protected.

3. An OTO number or 'passcode' is generated using a seed and hash algorithm, and then appended to the base URL. This URL would be OTO. The seed would need to be protected.

Option 3, an OTO passcode generator, is the most secure option. OTO passcodes appended to URLs would provide a low to medium level of security suitable for applications like web-email login (i.e. low-mid level security, protecting low value information).

The method for generating OTO passcodes would use a simple hash algorithm to generate a unique code on each power-up (i.e. a "passcode"). The hash algorithm would be a part of the program stored on the USB chip of the autorun device. The chip would also have a "key", stored in the program memory (i.e. an alpha-numeric string). If the "key" is unique for each device this would make it even more secure.

Figure 36:
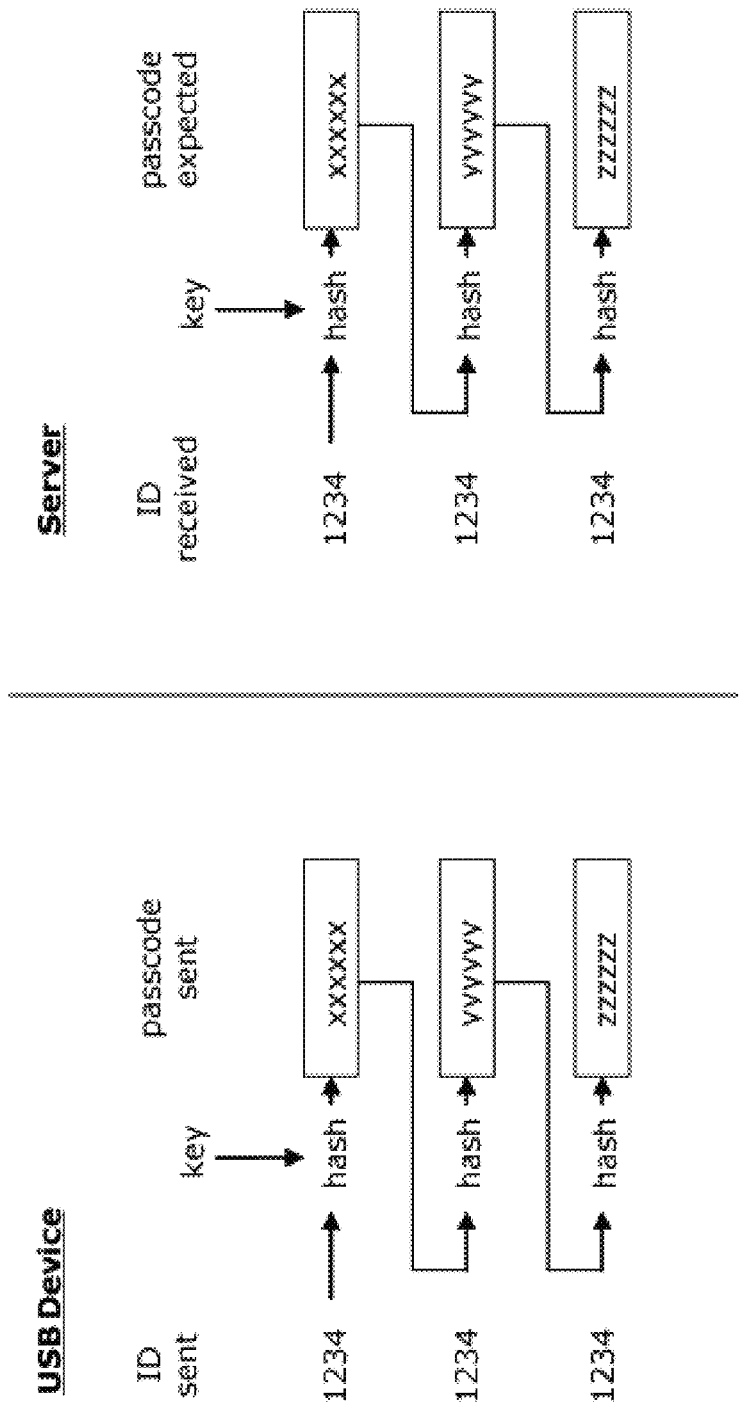
FIG. 36 shows a diagram of the processes involved in a USB autorun device using one-time-only data.

On power-up the USB chip would use the hash algorithm, the key, and the previous passcode to generate the next passcode (if it was the first power-up after production it would use the ID number instead of a previous passcode). The USB chip would store the passcode in the external memory ready for next time. Finally, the ID and passcode would be added to the URL and the autorun process would start. The server receiving the URL would also know the algorithm and key and would calculate which passcode to expect. FIG. 36 shows a diagram of how the process might work.

For example, the final URLs might be:
1st Connection http://www.vc.com/login.cgi?userid=1234&passcode=15128
2nd Connection http://www.vc.com/login.cgi?userid=1234&passcode=11477
3rd Connection http://www.vc.com/login.cgi?userid=1234&passcode=15008
4th Connection etc. . . .

FIG. 36 illustrates the operation of this device.

The following sections will describe the detailed design and operation of some implementations.

USB Web-Mail Key

Figure 37:
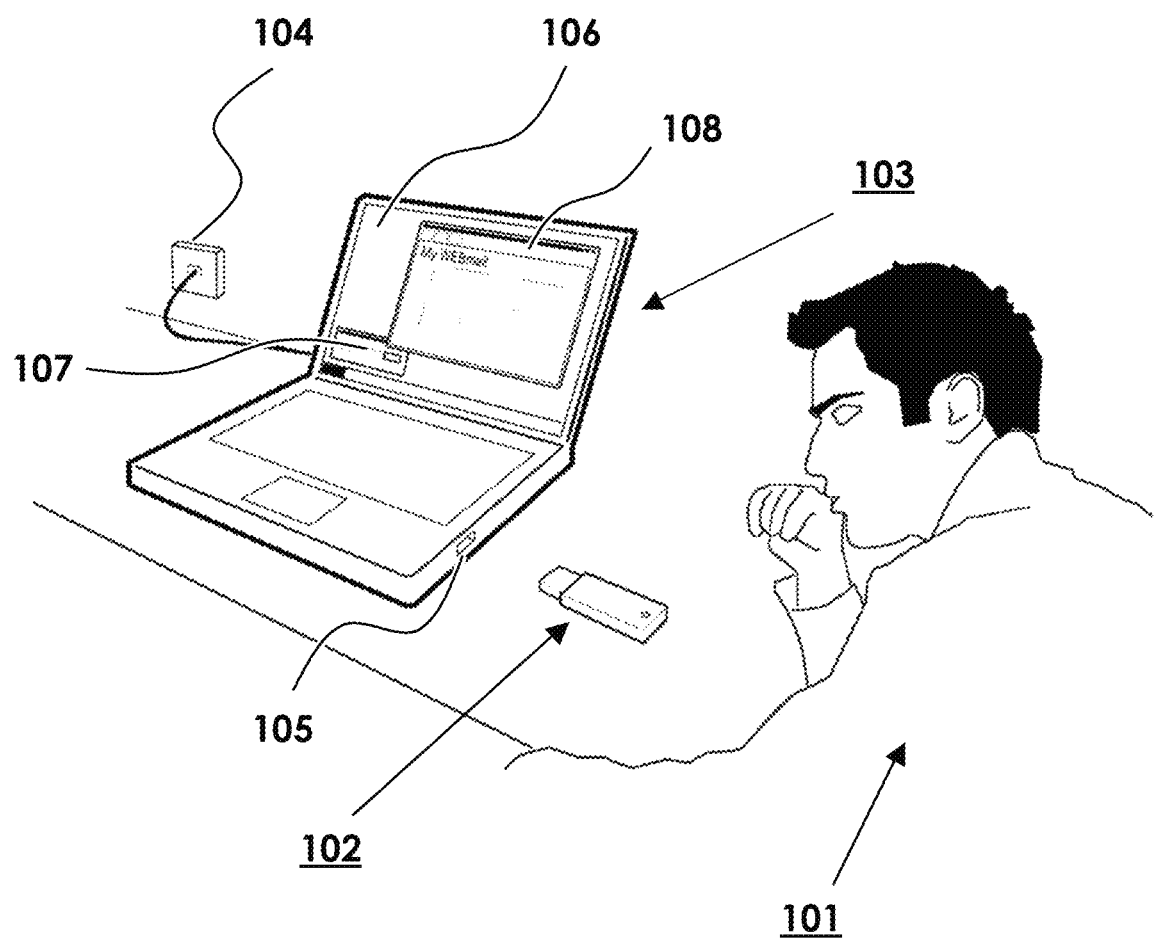
FIG. 37 is an example of an embodiment of the invention for the application as a USB web-mail key

This device type is show in FIG. 37. User 101 has newly subscribed to an internet email service, which can be accessed through an internet browser application, enabling him to view and send email messages from any personal computer with an internet connection.

A web-mail access apparatus 102 comprises a USB-compatible processor component; a USB connector; and external graphical elements (not shown) referring to the web-mail account and the web-mail service in general.

Personal Computer (PC) 103 has an internet connection 104; a USB port 105 and an Operating System (OS), incorporating software (e.g. USB HID profile) capable of receiving and processing keycodes (simulating key-strokes) from an external device (without requiring additional drivers); and Graphical User Interface (GUI) 106.

Upon user 101 connecting web-mail access apparatus 102 to the USB port of PC 103, the apparatus powers up and begins an initialisation process. On initialisation apparatus 102 enumerates as a HID keyboard interface and is recognised as such by the Operating System.

After the apparatus has been successfully initialised the apparatus transmits (in a timed sequence) an initial series of keycodes to the Operating System. Each keycode represents and simulates a keystroke, such as those performed when a user strikes a key on the PC keyboard. The initial series of keycodes sent by the apparatus 102 to the PC 103 are interpreted by the Operating System as a sequence of keystrokes that launch software application 107. (In this example, the software application 107 is a standard feature of the Operating System that enables direct access to programs, files, network paths and internet URLs—for example, Windows Run). In response to this keystroke sequence the Operating System launches the application.

After a programmed time period, (allowing time for the application to fully open) the apparatus 102 sends a second series of timed keycodes to the PC 103. This second series of keycodes is interpreted by the Operating System as a sequence of keystrokes that represent data entry to the application 107 in the form of a text string URL (Universal Resource Locator). In this example the URL represents the website of the internet email service subscribed to by user 101. In the preferred embodiment, the URL includes a command for automated user login (for example, a query string including username and password that will be processed by a script running on the server). The last keycode sent from the apparatus 102 to PC 103 is interpreted by the OS as a confirmation and execution command, and is sent to the application 107 (for example, the ENTER key). The first and/or second set of keycodes (or any other set) can include unique data—e.g data identifying or authenticating a user and/or the apparatus 102.

Application 107 then opens the URL using the Operating System's default internet browser 108; the browser in turn displays the internet page of the web-mail service subscribed to by user 101. After initiating access to the URL, application 107 automatically closes (for illustration purposes the application is shown open in FIG. 37.)

In an alternative embodiment, where a higher level of security is desired, the URL entered into application 107 may not include a full command for automated login, but instead only a part of the login, such as the username. In this case, the web page reached by the URL is a login page for user 101, with only a password entry being required. The password may then be entered by the user in the traditional method using the keyboard or may be entered by apparatus 102 as an automated series of keycodes representing the password string; upon the user pressing a button on apparatus 102, once.

In the example embodiment of FIG. 37, the user 101 has previously subscribed to a web-mail service. Apparatus 102 has been pre-programmed (for example at the store where the subscription was purchased) with the user's unique identifier information and thus represents his personal access to his web-mail. The web service is graphically represented on the case of the apparatus 102. The user thus becomes accustomed to thinking of his web-mail access as apparatus 102 and carries the apparatus with him; using it as a universal 'key' to access his email on any compatible internet-connected computer, simply and easily.

Since most Operating Systems include the necessary functionality (such as the HID software) allowing the application such as 107 to initiate web-mail access, the user can gain almost universal access, from a very wide range of computer terminals.

So, in use, user 101 connects web-mail access apparatus 102 to the USB port of an internet connected PC, such as 103. The apparatus then automatically sends a series of keycodes to the PC that control the Operating System 106 as previously described. This results in the default internet browser launching and automatically opening the internet page of the user's web-mail service.

Technical and functional details of the web-mail key example embodiment are described below with reference to the figures.

Figure 38:
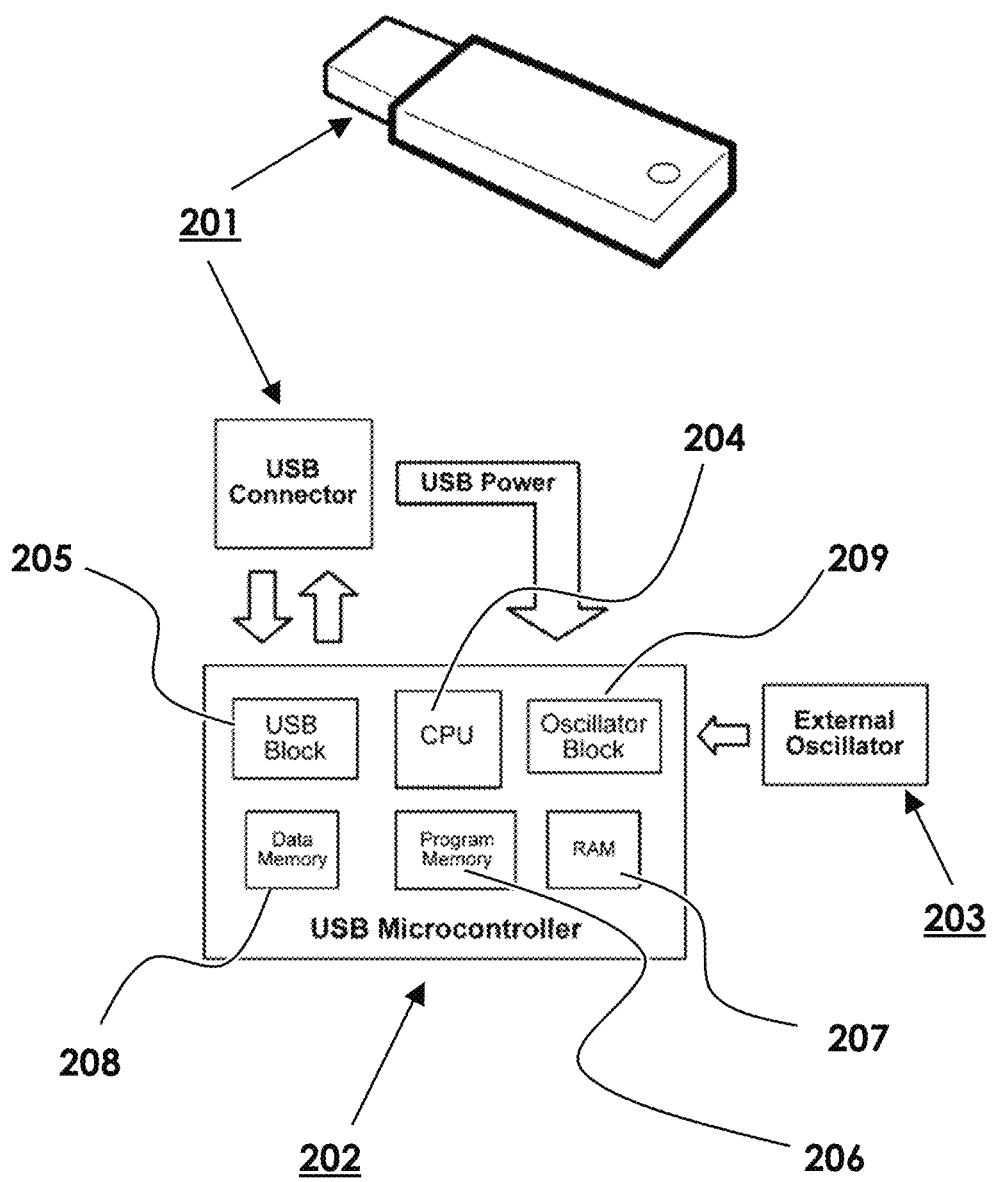
FIG. 38 is a block diagram showing the functional components of apparatus 102 of FIG. 1 in more detail.

FIG. 38 is a block diagram showing the functional components of apparatus 102 in more detail. Apparatus 102 comprises a USB connector 201; a USB-compatible microcontroller 202 and an external oscillator 203. USB microcontroller 202 comprises a CPU 204; a USB interface block 205; program memory 206; RAM 207; data memory 208; and an oscillator block 209.

USB microcontroller 202 is programmed with firmware (application code and USB descriptors) that enables apparatus 102 to enumerate as a HID keyboard interface when connected to a PC.

When apparatus 102 is connected to the USB port of a PC, USB microcontroller 202 powers up and begins to run firmware stored in program memory 206. After successfully enumerating as a HID keyboard, the microcontroller accesses data stored in data memory 208; the data having been pre-programmed and representing the action to be performed (in this example, control the OS to open the user's web-mail internet page using the default internet browser). The data read from memory is an instruction set that enables the microcontroller to perform the action.

The USB microcontroller 202 then performs the action by interpreting the instruction set and sending a series of paced USB data packets (or reports) to the PC via USB interface block 205; each packet of data sent representing a keycode (or combination of keycodes). This series of keycodes simulates a specific sequence of keystrokes that control the Operating System to carry out the action (in this example, resulting in the default internet browser of the PC automatically launching and opening the internet page of the user's web-mail service).

Figure 39:
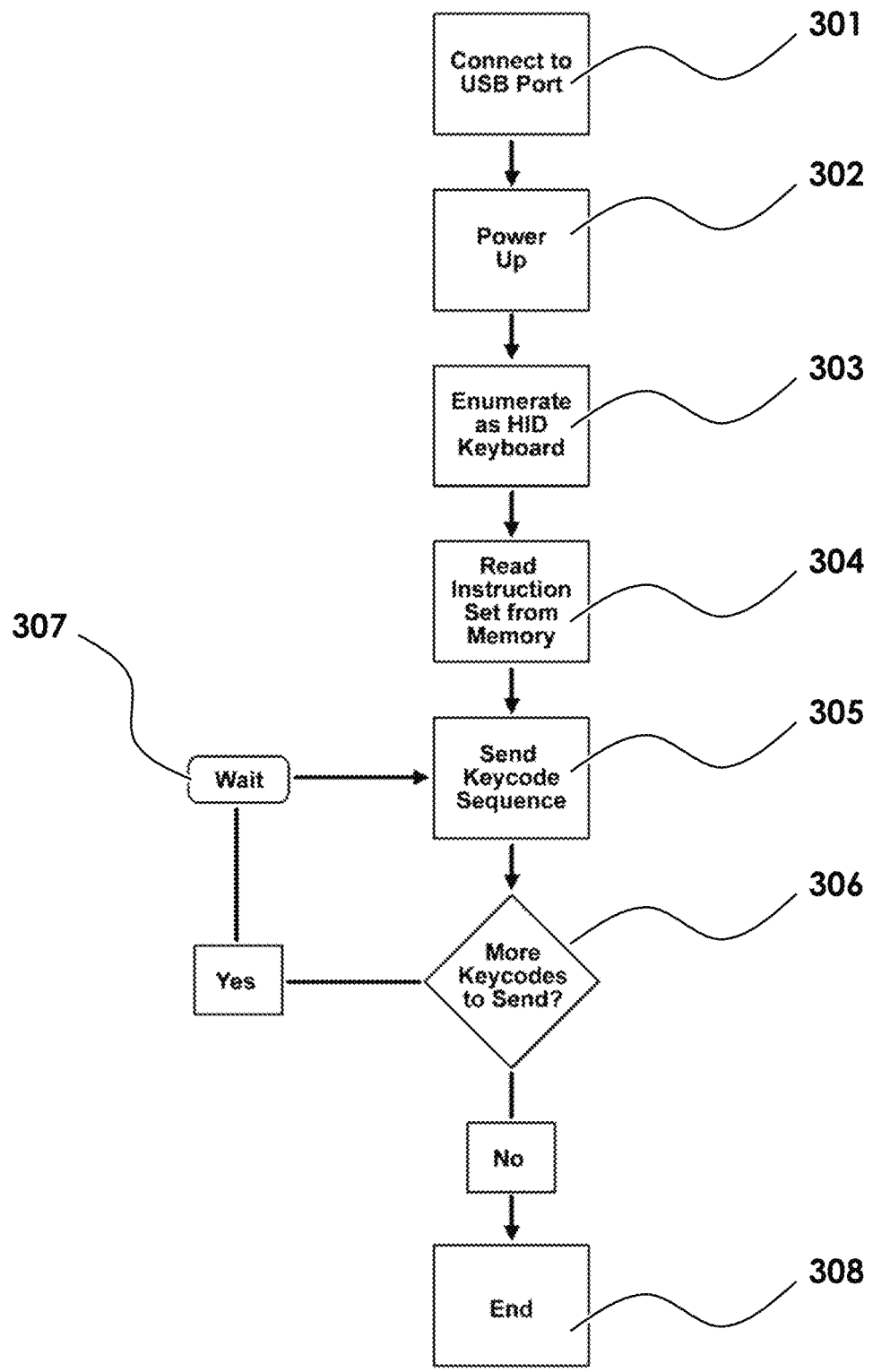
FIG. 39 is a flow diagram showing the general sequence of events that occurs when apparatus 102 of FIG. 37 is connected to a PC so that a pre-programmed action is performed.

FIG. 39 is a flow diagram showing the general sequence of events that occurs when apparatus 102 is connected to a PC so that a pre-programmed action is performed.

Figure 40:
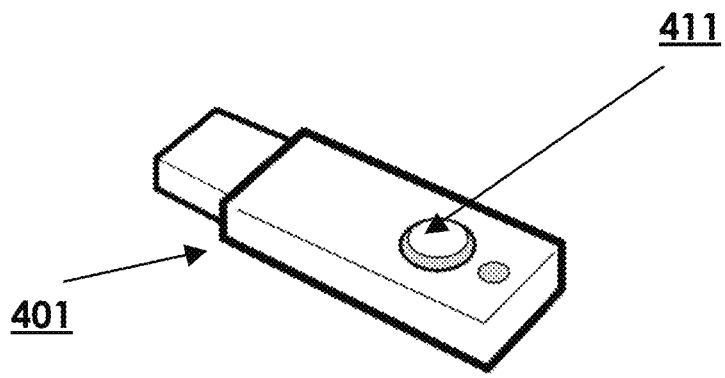
FIG. 40 shows an embodiment of the apparatus of the invention.

301—Apparatus 102 is connected to the USB port of a PC
302—Apparatus powers up
303—Apparatus communicates with the PC and enumerates as a HID keyboard
304—Instruction set is read from memory
305—First keycode sequence is sent to PC
306—Check instruction set for next keycode sequence
307—Wait for a period; then send second keycode sequence
308—End FIG. 40 shows an alternative embodiment 401 of the apparatus, having a button, 411 used to initiate a second sequence of operations.

Figure 41:
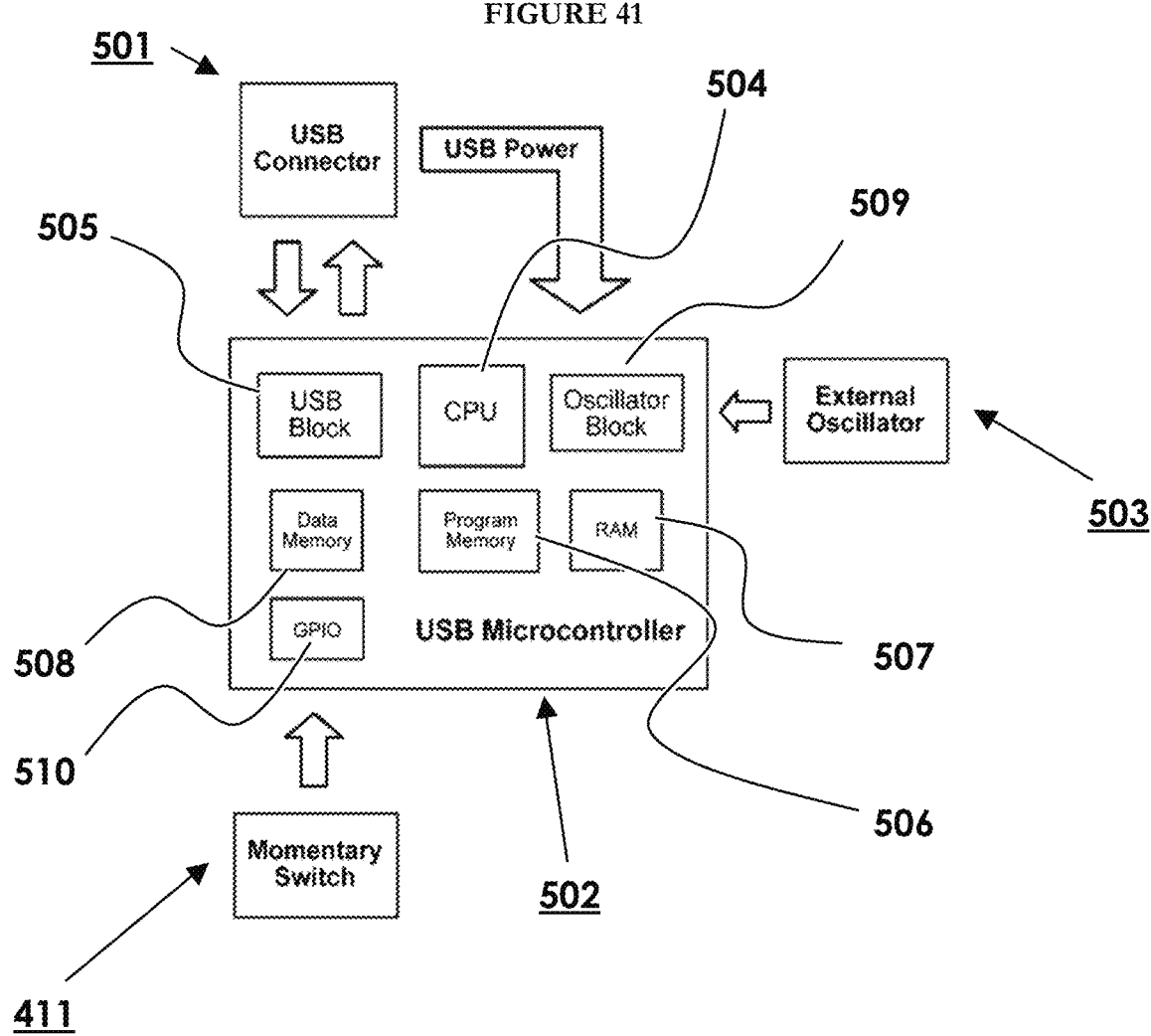
FIG. 41 is a block diagram showing the functional components of the apparatus 401 of FIG. 40.

FIG. 41 is a block diagram showing the functional components of an apparatus 401.

The apparatus comprises a USB connector; a USB-compatible microcontroller 502; an external oscillator 503; and a momentary push switch 411. USB microcontroller 502 may comprise a CPU 504; a USB interface block 505; program memory 506; RAM 507; data memory 508; an oscillator block 509; and a general purpose input/output port (GPIO) 510.

USB microcontroller 502 is programmed with firmware (application code and USB descriptors) that enables the apparatus to enumerate as a HID keyboard interface when connected to a PC, and subsequently to transmit keycodes in timed sequences. When the apparatus is connected to the USB port of a PC, USB microcontroller 502 powers up and begins to run firmware stored in program memory 506. After successfully enumerating as a HID keyboard, the microcontroller accesses data stored in data memory 508; the data having been pre-programmed and representing the action to be performed (in this example, control the OS to open the user's web-mail internet page using the PC's default internet browser). The data read from memory is an instruction set that enables the microcontroller to perform the action.

The USB microcontroller 502 then performs part of the action by interpreting the instruction set and sending a series of paced USB data packets (or reports) to the PC via USB interface block 505; each packet of data sent representing a keycode (or combination of keycodes). This series of keycodes simulates a specific sequence of keystrokes that control the Operating System to carry out part of the action (in this example, resulting in the default internet browser of the PC automatically launching and opening the login page of the user's web-mail service). The microcontroller then waits for the user to press switch 511. When the switch is pressed a second series of keycodes are sent to the PC and the remaining part of the action is performed (in this example, the password is entered into the login page of the user's web-mail service).

Figure 42:
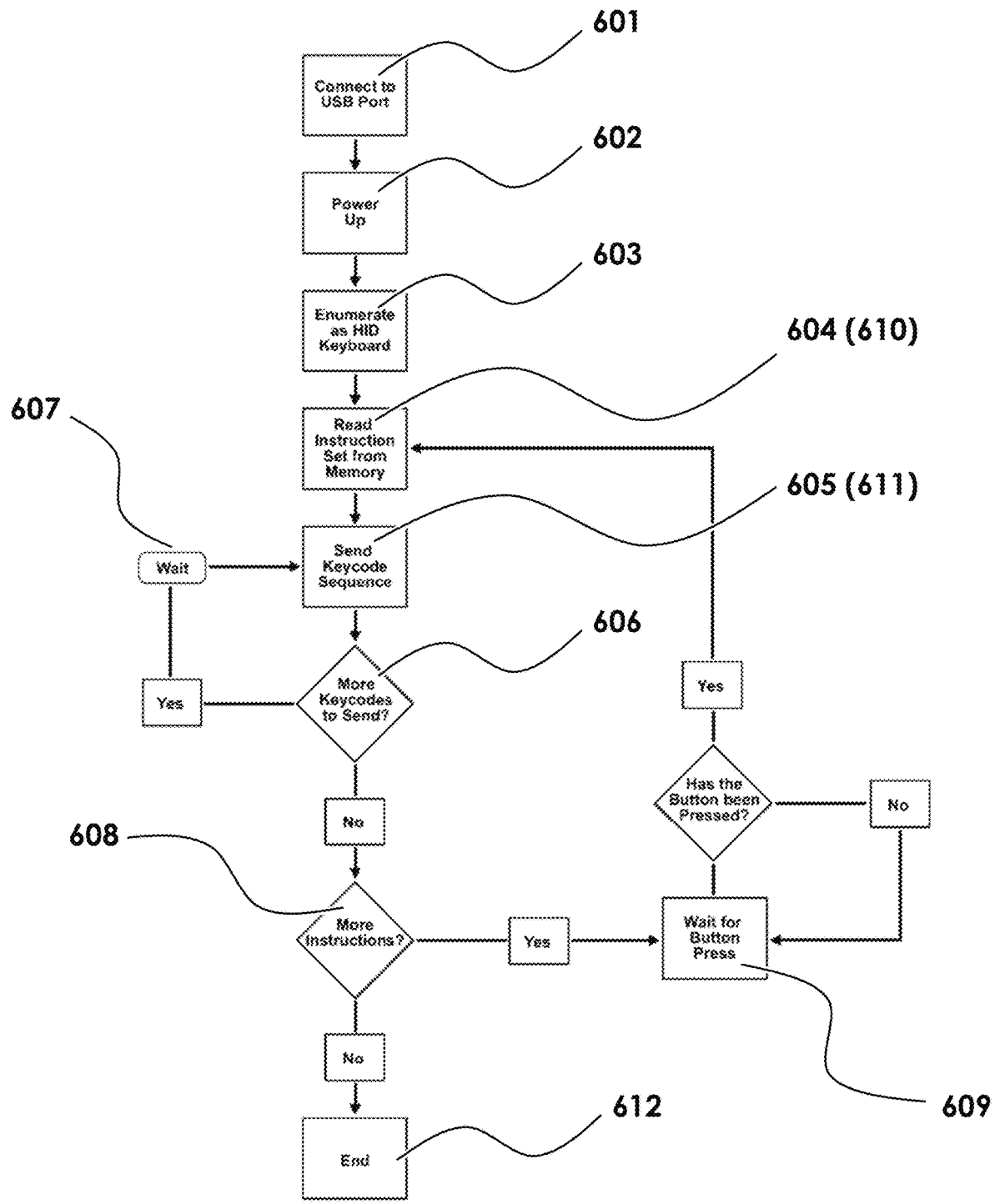
FIG. 42 is a flow diagram showing the general sequence of events that occurs when apparatus 401 of FIG. 40 is connected to a PC

FIG. 42 is a flow diagram showing the general sequence of events that occurs when apparatus 401 (including a button) is connected to a PC so that a set of pre-programmed actions is performed, followed by a user-initiated second sequence of pre-programmed actions.

601—Apparatus is connected to the USB port of a PC
602—Apparatus powers up
603—Apparatus enumerates as a HID keyboard
604—First instruction set is read from memory
605—First keycode sequence is sent to PC
606—Check instruction set for next keycode sequence
607—Wait for a period; then send next keycode sequence
608—Check for next instruction
609—Wait for button press
610—Next instruction set is read from memory
611—Send next keycode sequence
612—End Examples of Variants Selected alternative embodiments of the present invention are briefly described below. The example embodiments are described with reference to the figures.

Figure 43:
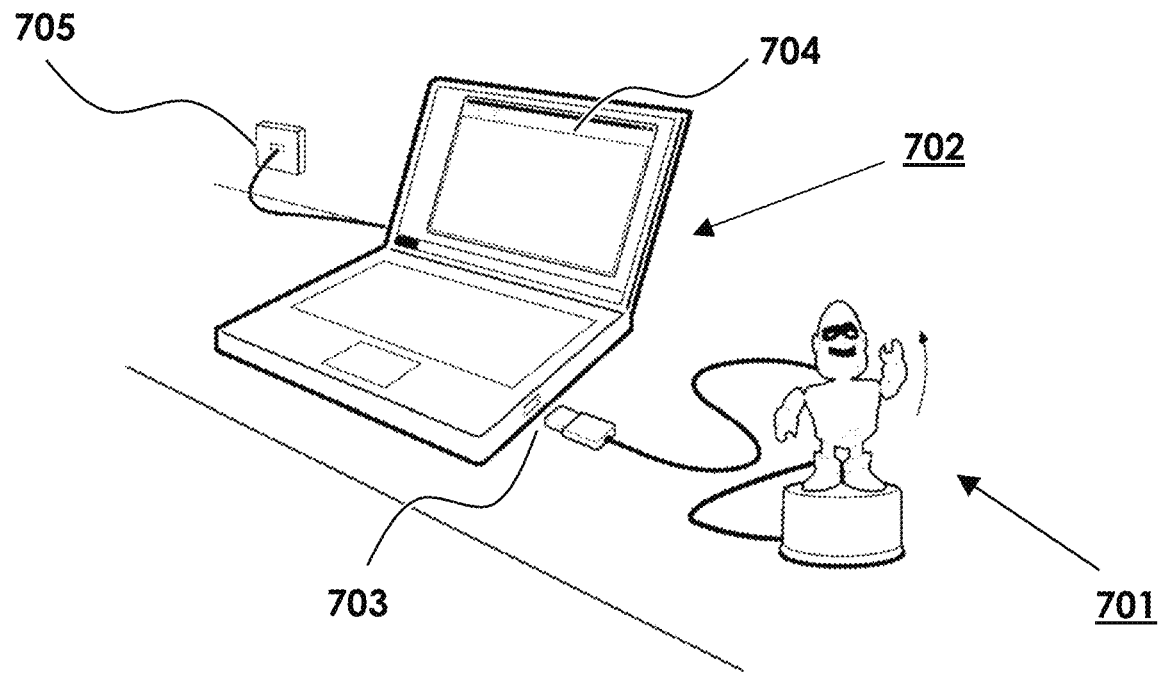
FIG. 43 shows a toy which, when connected to a computer, opens an internet page containing the next episode of a web comic story.

FIG. 43 shows a 'superhero' toy which, when connected to a computer, opens an internet page containing the next episode of a web comic story.

Toy 701 comprises a USB processor component; and a USB connector and cable. Toy 701 may also incorporate sensors and electro-mechanical actuators; for example a solenoid-controlled mechanism to open and close the mouth of the toy, in response to signals either a) from a microphone sensor included in the toy, or b) from signals from the PC, for example representing 'modifier' keycode (such as 'Caps Lock' or 'Num-Lock').

Personal Computer (PC) 702 has an internet connection 705; a USB port 703; and an Operating System (OS) and Graphical User Interface (GUI).

When a user connects apparatus 701 to the USB port of PC 702, the apparatus powers up and initialises. On initialisation, apparatus 701 enumerates as a HID keyboard interface and is recognised by the Operating System.

After the apparatus has been successfully initialised the apparatus sends an initial series of paced keycodes to the Operating System. Each keycode represents a keystroke, such as are sent when a user strikes a key on the PC keyboard. The initial series of keycodes sent by the apparatus 701 to the PC 702 is interpreted by the Operating System as a sequence of keystrokes that universally launch a system software application. (In this example, the software application is a standard feature of the Operating System that enables direct access to programs, files, network paths and internet URLs—for example, Windows Run). In response to this keystroke sequence the Operating System launches the application.

After a programmed time period, the apparatus 701 sends a second series of paced keycodes to the PC. This second series of keycodes are interpreted by the Operating System as a sequence of keystrokes that represent data entry to the system application in the form of a text string URL (Universal Resource Locator). The URL represents the internet page of the web comic story. In the preferred embodiment, the URL includes a user ID (for example, a query string including a user ID number that will be processed by a server side script). Passing a user ID to the remote server enables content to be unique to the user and/or different content to be accessed incrementally (for example, episode 1 of the story is shown when the apparatus is first connected; episode 2 on the second connection and so on).

The last keycode sent from the apparatus 701 to the PC is interpreted by the OS as a confirmation and execution command for the system application (for example, ENTER key). The system application then opens the URL using the Operating System's default internet browser 704; the browser in turn displays the internet page of the web comic story.

So, in use, a user connects superhero toy 701 to the USB port of an internet-connected PC 702. The apparatus then automatically sends a series of keycodes to the PC that control the Operating System as previously described. This results in the default internet browser 704 launching and automatically opening an internet page containing the next episode of a web comic story.

Various enhancements to this example embodiment may be achieved by the addition of simple sensors and electro-mechanical actuators to the toy. For example, as the web comic story plays within the internet browser, the body parts of toy 701 may be animated by electro-magnets or miniature motors. The story on screen and the toy may then appear to interact with each other (for example, a character on the PC screen and the superhero toy 701 may move in unison); or the toy may appear to be enhanced by the multimedia capabilities of the PC (for example, audio from the PC, in the form of dialog in the superhero's voice, may be synchronised with the automated mouth movements of toy 701). Adding simple sensors to toy 701, to detect push and rotation for example, may enable control of the content within internet browser 704 by means of manual mechanical interactions with toy 701.

A further enhancement is USB communication back from the PC 702 to the toy 701. This enables content within the internet browser to send commands to toy 701 and thus control the toy's movements in response to specific timed events within the content (for example, a character within the story on-screen may ask a question and the toy may reply—the mouth movements of the toy being synchronised with the audio).

It is desirable to maintain USB communication within a 'driverless' protocol. So for example, in the case of an interactive toy such as Toy 701, an additional USB interface (again using only standard system drivers) allows communication from the PC to the Toy 701, enabling signals (that can be interpreted by the processor of Toy 701) for control of the Toy 701 to be sent. Signals thus pass from the application, via the PC to the toy. For example, a generic HID interface or USB Audio interface may be used.

A significant advantage of the invention applied to Toys is that the normal input devices such as a keyboard and mouse may be covered, disabled or removed entirely by unplugging from the PC for the duration of the interaction; thus ensuring that children playing with the PC by use of the Toy cannot access or damage other data held on the PC.

Figure 44:
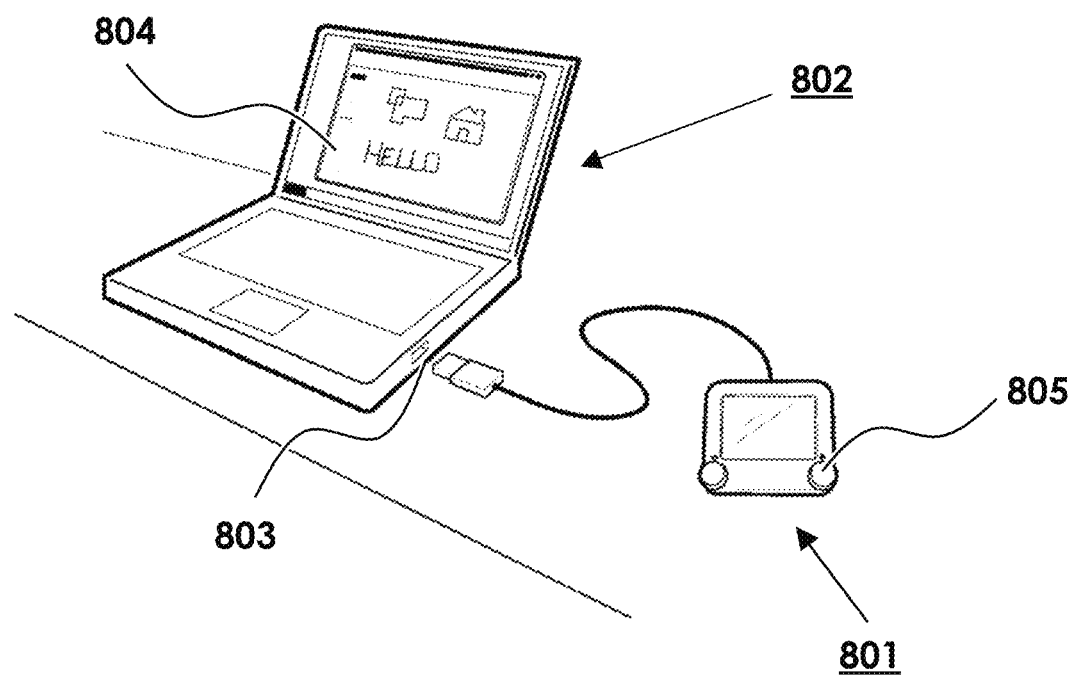
FIG. 44 shows an "etch-a-sketch" style toy which, when connected to a computer, opens a standard drawing application and enables the user to create drawings using a simple interface on the toy.

FIG. 44 shows an "etch-a-sketch" style toy which, when connected to a computer, opens a standard drawing application and enables the user to create drawings using a simple interface on the toy. Toy 801 comprises a USB processor component; a USB connector and cable; and a simple user interface 805. User interface 805 may for example comprise two rotary knobs and two push buttons. Personal Computer (PC) 802 has a USB port 803; and an Operating System (OS) and Graphical User Interface (GUI).

When a user connects apparatus 801 to the USB port of PC 802, the apparatus powers up and initialises. On initialisation, apparatus 802 enumerates as both a HID keyboard interface and a HID mouse interface and is recognised by the Operating System.

After the apparatus has been successfully initialised the apparatus sends an initial series of paced keycodes to the Operating System. Each keycode represents a keystroke, such as are sent when a user strikes a key on the PC keyboard. The initial series of keycodes sent by the apparatus 801 to the PC 802 are interpreted by the Operating System as a sequence of keystrokes that universally launch a system software application. (In this example, the software application is a standard feature of the Operating System that enables direct access to programs, files, network paths and internet URLs—for example, Windows Run). In response to this keystroke sequence the Operating System launches the application.

After a programmed time period, the apparatus 801 sends a second series of paced keycodes to the PC. This second series of keycodes are interpreted by the Operating System as a sequence of keystrokes that represent data entry to the system application in the form of a text string. The text string represents the name of a standard drawing application, such as Microsoft Paint.

The last keycode sent from the apparatus 801 to the PC is interpreted by the OS as a confirmation and execution command for the system application (for example, ENTER key). The system application then opens the drawing application 804.

After the drawing application has been opened, the user can use interface 805 to control the movement of the cursor within the drawing application on the PC screen and thus create drawings using the toy as a new input apparatus. When the interface is acted upon, data is sent from apparatus 801 to the PC representing mouse X, Y and button events (for example, turning a left rotary knob may cause data representing a mouse button press and cursor movements from left to right to be sent to the PC, resulting in a horizontal line being drawn within the drawing application).

Interface 805 may also be used to initiate other actions with the drawing application by sending keystroke sequences to the PC (for example, pressing a left button may cause a series of keycodes to be sent to the PC, resulting in the canvas being cleared). So, in use, a user connects toy 801 to the USB port of an internet connected PC 802. The apparatus then automatically sends a series of keycodes to the PC that control the Operating System as previously described. This results in a standard drawing application, such as Microsoft Paint, automatically launching. The user can then create drawings using interface 805 on the toy.

It can be appreciated from the above examples that there is significant value in the intuitive nature of the interaction, particularly for certain sections of the market such as children. The apparatus is either marked in such a way as to become associated visually with the action or actions it performs, for example by printed graphics and/or text; or is directly shaped into a configuration that is representative of the interaction, for example the 'etch-a-sketch' or 'superhero' configurations. In some cases, a proprietary shape may be used under license, such as a Disney® character (or characters), in both the apparatus and the content on the PC.

Figure 45:
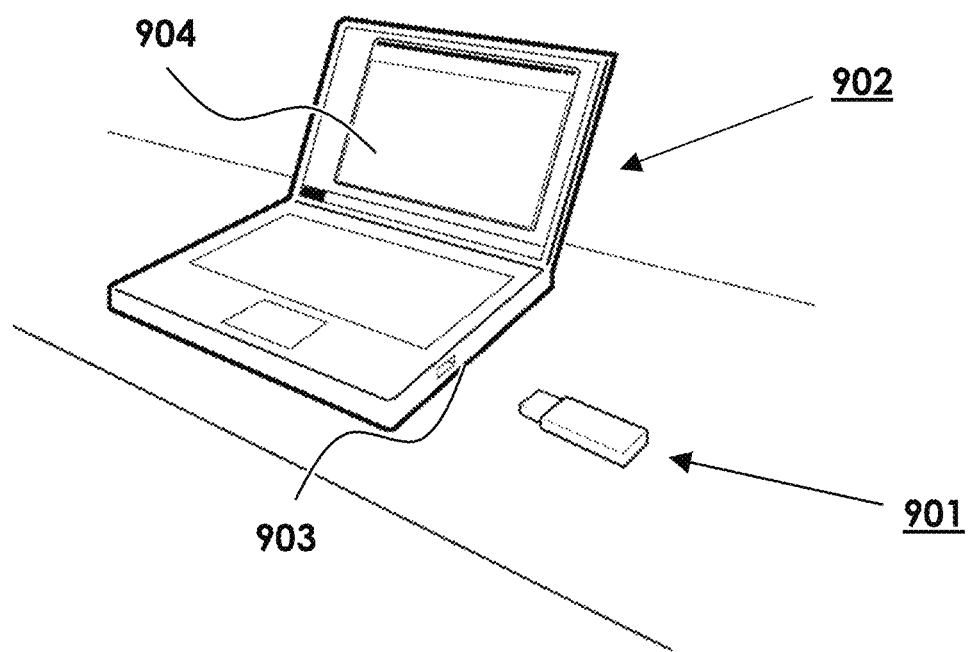
FIG. 45 shows a USB storage apparatus which, when connected to a computer, automatically opens a file stored within memory held on the apparatus itself.

FIG. 45 shows a USB storage apparatus which, when connected to a computer, automatically opens a file stored within memory held on the apparatus itself. The file may be an application or any other type of file recognised by the operating system. (This device is an extension of the invention in that it includes mass storage).

Apparatus 901 comprises a USB processor component; a mass storage component; and a USB connector. Personal Computer (PC) 902 has a USB port 903; and an Operating System (OS) and Graphical User Interface (GUI).

When a user connects apparatus 901 to the USB port of PC 902, the apparatus powers up and initialises. On initialisation, apparatus 902 enumerates as both a HID keyboard interface and a Mass Storage interface and is recognised by the Operating System.

After the apparatus has been successfully initialised the apparatus sends an initial series of paced keycodes to the Operating System. Each keycode represents a keystroke, such as are sent when a user strikes a key on the PC keyboard. The initial series of keycodes sent by the apparatus 901 to the PC 902 are interpreted by the Operating System as a sequence of keystrokes that universally launch a system software application. (In this example, the software application is a standard feature of the Operating System that enables direct access to programs, files, network paths and internet URLs—for example, Windows Run). In response to this keystroke sequence the Operating System launches the application.

After a programmed time period, the apparatus 901 sends a second series of paced keycodes to the PC. This second series of keycodes are interpreted by the Operating System as a sequence of keystrokes that represent data entry to the system application in the form of a text string. The text string represents the file-path of the file stored on the mass storage component of the apparatus 901.

The last keycode sent from the apparatus 901 to the PC is interpreted by the OS as a confirmation and execution command for the system application (for example, ENTER key). The system application then opens or runs the file and displays the result 904.

The invention claimed is:

1. A portable handheld electronic money token that can be used to purchase goods or services or as electronic cash; in which:
    (a) the portable handheld token includes a USB human interface device (HID) keyboard autorun device including a USB connector;
    (b) the USB HID keyboard autorun device is configured to send to a computing device a sequence of data including unique data identifying the USB HID keyboard autorun device, complying with a standard protocol, in response to the USB connector being inserted into a USB port of the computing device, without requiring driver installation;
    (c) the sequence of data is processable at the computing device to automatically open a connection to a web server that enables the token to be used to purchase goods or services or as electronic cash; and
    (d) in which the sequence of data, without any prior input of a website address for the web server or login data for that website or prior input of the unique data identifying the USB HID keyboard autorun device at any earlier time by a user, is processable at the computing device to automate direct access, over the internet, to the web server.

2. The portable handheld electronic money token of claim 1 wherein the sequence of data includes at least one of a URL, a login, a password, a one-time-only passcode, a query string, a launch command, a confirmation command, an execution command, a phone number, a dial string.

3. The portable handheld electronic money token of claim 1 wherein the USB HID keyboard autorun device generates and sends a unique sequence of data each time it is inserted into the computing device.

4. The portable handheld electronic money token of claim 1 wherein the USB HID keyboard autorun device generates and sends a unique URL each time it is inserted into the computing device.

5. The portable handheld electronic money token of claim 1 further comprising an output device integrated with the USB HID keyboard autorun device, wherein the output device responds to USB communications from the computing device.

6. The portable handheld electronic money token of claim 1 wherein the USB HID keyboard autorun device incorporates RFID, a smartcard, a fingerprint scanner, or a keypad.

7. The portable handheld electronic money token of claim 1 wherein the USB HID keyboard autorun device does not incorporate user-accessible memory.

8. The portable handheld electronic money token of claim 1 wherein the USB HID keyboard autorun device generates a one-time password which is verified via redirection to a $3^{rd}$ party web site.

9. The portable handheld electronic money token of claim 1 wherein a unique one-time-only sequence of data is generated and sent by the USB HID keyboard autorun device and corresponds to a passcode expected by the server.

10. The portable handheld electronic money token of claim 1 wherein the USB HID keyboard autorun device and a passcode are both required to enable access to a transaction.

11. The portable handheld electronic money token of claim 1 wherein the USB HID keyboard autorun device sequence of data includes data generated using a seed and hash algorithm and appended to a URL.

12. The portable handheld electronic money token of claim 1 wherein the USB HID keyboard autorun device, when inserted a second time into the computing device, retrieves information entered by a user the first time it was inserted into the computing device.

13. The portable handheld electronic money token of claim 1 wherein the USB HID keyboard autorun device has a unique ID that cannot be modified by end users via USB.

14. The portable handheld electronic money token of claim 1 wherein the USB HID keyboard autorun device automatically renders payment when inserted into the computing device.

15. The portable handheld electronic money token of claim 1 wherein the USB HID keyboard autorun device tops up a stored value card as a result of insertion into the computing device.

16. The portable handheld electronic money token of claim 1 wherein the USB HID keyboard autorun device is incorporated into a credit card.

17. The portable handheld electronic money token of claim 1 wherein an item is moved to a digital shopping cart when a button on the USB HID keyboard autorun device is pressed.

18. The portable handheld electronic money token of claim 1 wherein an item is purchased when a button on the USB HID keyboard autorun device is pressed.

19. The portable handheld electronic money token of claim 1 wherein the USB HID keyboard autorun device adds digital currency to an online account when inserted into the computing device.

20. The portable handheld electronic money token of claim 1 wherein the device has been pre-programmed with the user's information.

21. The portable handheld electronic money token of claim 1 wherein the USB HID keyboard autorun device is pre-loaded with an ID corresponding to customer information.

22. The portable handheld electronic money token of claim 1 wherein the USB HID keyboard autorun device has a pre-linked ID corresponding to destination user information.

23. The portable handheld electronic money token of claim 1 wherein the data automatically sent from the USB HID keyboard autorun device to the terminal causes a URL to be sent by that terminal to open a specific website address, wherein a unique user ID and password, or passcode, are appended to the URL and passed as parameters to the web server.

24. The portable handheld electronic money token of claim 1, including a one-time-only (OTO) passcode generator, wherein the USB HID keyboard autorun device is configured to open an internet URL with an ID number and a OTO passcode appended and passed as parameters to the web server.

25. The portable handheld electronic money token of claim 1, wherein the USB HID keyboard autorun device is configured to generate an OTO number or 'passcode' using a seed and hash algorithm, which is then appended to a URL, and sent to the web server.

26. The portable handheld electronic money token of claim 1, wherein the USB HID keyboard autorun device is configured to include one-time-only (OTO) data in a URL, which is sent to the web server.

27. The portable handheld electronic money token of claim 1, wherein the USB HID keyboard autorun device autoruns to open a URL of a secure web site and includes one-time-only (OTO) data in the URL so that the device can be authenticated by a server.

28. The portable handheld electronic money token of claim 1, wherein the USB HID keyboard autorun device includes a button, wherein the USB HID keyboard autorun device sends a separate pre-programmed or alternatively user-programmed sequence of keycodes to the computing device, in response to receiving a press of the button.

29. The portable handheld electronic money token of claim 1, wherein the USB HID keyboard autorun device includes a button, wherein the USB HID keyboard autorun device sends a second sequence of data to the computing device, in response to receiving a press of the button.

30. A system including a web server and a portable handheld electronic money token, in which the portable handheld electronic money token can be used to purchase goods or services or as electronic cash; in which:

(a) the portable handheld token includes a USB HID keyboard autorun device including a USB connector;
(b) the USB HID keyboard autorun device is configured to send to a computing device a sequence of data including unique data identifying the USB HID keyboard autorun device, complying with a standard protocol, in response to the USB connector being inserted into a USB port of the computing device, without requiring driver installation;
(c) the sequence of data is processable at the computing device to automatically open a connection to the web server that enables the token to be used to purchase goods or services or as electronic cash; and
(d) in which the sequence of data, without any prior input of a website address for the web server or login data for that website or prior input of the unique data identifying the USB HID keyboard autorun device at any earlier time by a user, is processable at the computing device to automate direct access, over the internet, to the web server.

31. A method in which a portable handheld electronic money token is used to purchase goods or services, or is used as electronic cash, the method including the steps of:

(i) the portable handheld token including a USB HID keyboard autorun device, the USB HID keyboard autorun device including a USB connector, sending to a computing device a sequence of data including unique data identifying the USB HID keyboard autorun device, and complying with a standard protocol, in response to the USB connector being inserted into a USB port of the computing device, without requiring driver installation;
(ii) the computing device processing the sequence of data to automatically open a connection to a web server, wherein the token is used to purchase goods or services or as electronic cash; and
(iii) the computing device processing the sequence of data, without any prior input of a website address for the web server or login data for that website or prior input of the unique data identifying the USB HID keyboard autorun device at any earlier time by a user, to automate direct access, over the internet, to the web server.

* * * * *